United States Patent
Mizuno et al.

(10) Patent No.: US 7,730,225 B2
(45) Date of Patent: Jun. 1, 2010

(54) INFORMATION PROCESSING APPARATUS, INFORMATION TRANSMISSION METHOD, AND CONTROL PROGRAM THEREFOR

(75) Inventors: Atsushi Mizuno, Yokohama (JP); Atsushi Daigo, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 12/105,583

(22) Filed: Apr. 18, 2008

(65) Prior Publication Data
US 2008/0263230 A1    Oct. 23, 2008

(30) Foreign Application Priority Data
Apr. 20, 2007    (JP)    ............... 2007-111936

(51) Int. Cl.
*G06F 3/12*    (2006.01)
*G06F 3/00*    (2006.01)

(52) U.S. Cl. .............. 710/8; 358/1.1; 710/10; 710/11; 710/14; 710/16

(58) Field of Classification Search ......... 358/1.1–3.32, 358/400, 404, 406, 305; 399/75, 82, 83, 399/85–90; 710/1, 8, 10, 11, 14, 16, 17
See application file for complete search history.

(56) References Cited

U.S. PATENT DOCUMENTS

| 6,456,388 | B1 | 9/2002 | Inoue et al. |
|---|---|---|---|
| 6,747,753 | B1 | 6/2004 | Yamamoto |
| 6,947,949 | B2 | 9/2005 | Fujisawa |
| 2006/0070087 | A1 * | 3/2006 | Ando et al. ............. 719/320 |

FOREIGN PATENT DOCUMENTS

| JP | 11-53132 A | 2/1999 |
|---|---|---|
| JP | 11-282684 A | 10/1999 |
| JP | 2002-287990 A | 10/2002 |
| JP | 2003-256216 A | 9/2003 |

* cited by examiner

*Primary Examiner*—Alford W Kindred
*Assistant Examiner*—Richard Franklin
(74) *Attorney, Agent, or Firm*—Canon USA Inc IP Division

(57) ABSTRACT

An information processing apparatus includes an acquisition unit configured to acquire, from a plurality of image forming apparatuses, application information indicating a type of each application program installed on the plurality of image forming apparatuses, an application selection receiving unit configured to receive selection of an application program corresponding to the acquired application information, a setting information selection receiving unit configured to receive selection of setting information used in the application program whose selection has been received, an apparatus selection receiving unit configured to receive selection of an image forming apparatus as a destination to which to transmit the setting information from among image forming apparatuses installed with the application program whose selection has been received, and a transmission control unit configured to control processing for transmitting, to the image forming apparatus whose selection has been received, the setting information whose selection has been received.

11 Claims, 24 Drawing Sheets

FIG.2
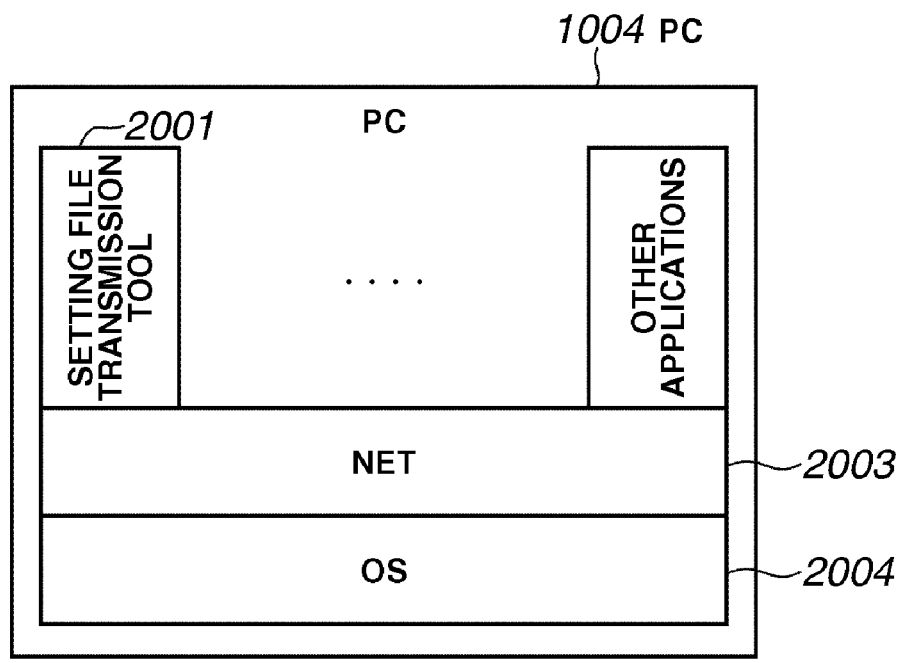
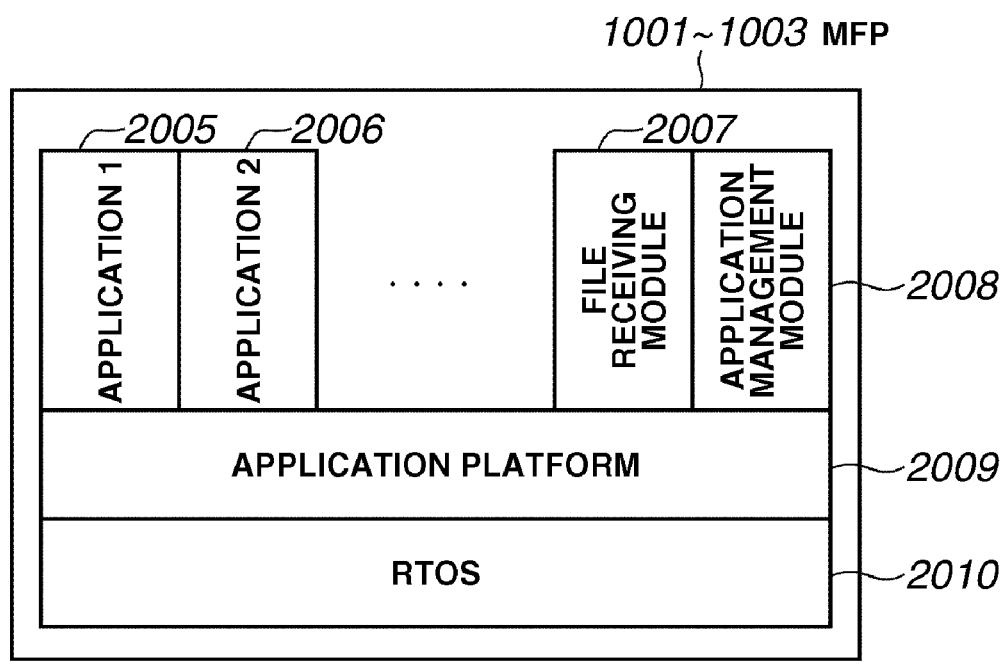

FIG.3A

| KEY | VALUE |
|---|---|
| DEVICE INFORMATION | |
| DEVICE DETECTION MODE | SERVER DETECTION MODE, AUTO OR MANUAL? |
| DEVICE STATUS | COMMUNICATION STATUS |
| UPDATE DATE AND TIME | LAST DATE AND TIME OF INFORMATION ACQUISITION |
| PORT NUMBER | PORT NUMBER USED IN ACQUIRING INFORMATION |
| DEVICE ID | DEVICE ID NUMBER |
| DEVICE INFORMATION | |
| DEVICE UNIQUE INFORMATION | |
| MAC ADDRESS | MAC ADDRESS |
| IP ADDRESS | IP ADDRESS |
| SERIAL NUMBER | DEVICE ID NUMBER |
| PRODUCT NAME | DEVICE NAME |
| FIRMWARE INFORMATION | |
| MEAP FIRMWARE VERSION | MEAP FIRMWARE VERSION |
| DEVICE NAME | DEVICE NAME (MFP1003) |
| DEVICE SPEC ID | DEVICE SPEC ID |
| INSTALLED APPLICATION INFORMATION | APPLICATION INDICATED IN LIST 7005 |
| APPLICATION INFORMATION | |
| APPLICATION ID | MEAP APPLICATION ID |
| VERSION | APPLICATION VERSION |
| APPLICATION NAME | APPLICATION NAME |
| INSTALLATION DATE AND TIME | INSTALLATION DATE AND TIME |
| STATUS | OPERATING? SUSPENDED? INSTALLED? |
| APPLICATION TYPE | NORMAL APPLICATION? USER AUTHENTICATION APPLICATION? |
| LICENSE INFORMATION | |
| PRESENCE OR ABSENCE OF LICENSE | PRESENCE OR ABSENCE OF LICENSE |
| LICENSE STATUS | LICENSE STATUS |

FIG.3B

| KEY | VALUE |
|---|---|
| GROUP LIST | |
| GROUP NAME | GROUP NAME |
| GROUP DESCRIPTION | GROUP DESCRIPTION |
| DEVICE LIST | |
| DEVICE NAME | DEVICE NAME |
| DEVICE ID | DEVICE ID |

FIG.3C

| KEY | VALUE |
|---|---|
| APPLICATION INFORMATION | |
|   APPLICATION ID | MEAP APPLICATION ID |
|   VERSION | |
|   APPLICATION NAME | APPLICATION NAME |
|   APPLICATION TYPE | NORMAL APPLICATION? USER AUTHENTICATION APPLICATION? |
|   APPLICATION DESCRIPTION | APPLICATION DESCRIPTION |
|   LICENSE INFORMATION | WHETHER LICENSE IS REQUIRED |
|   MANUFACTURER | MANUFACTURER OF APPLICATION |
|   RESOURCE INFORMATION (NUMBER OF THREADS) | NUMBER OF THREADS THAT APPLICATION USES |
|   RESOURCE INFORMATION (NUMBER OF SOCKETS) | NUMBER OF SOCKETS THAT APPLICATION USES |
|   RESOURCE INFORMATION (NUMBER OF FILE DESCRIPTORS) | NUMBER OF FILE DESCRIPTORS THAT APPLICATION USES |
|   RESOURCE INFORMATION (FILE SIZE) | FILE SIZE THAT APPLICATION USES |

FIG.3D

| KEY | VALUE |
|---|---|
| APPLICATION TO BE TRANSMITTED | |
|   APPLICATION NAME | APPLICATION NAME |
|   APPLICATION DISPLAY NAME | MAJOR ITEM |
|   VERSION LIST | |
|     VERSION INFORMATION | VERSION OF APPLICATION TO BE TRANSMITTED |
|     TRANSMISSION TYPE | TRANSMIT DURING SUSPENSION? TRANSMIT DURING OPERATION? |
|     SETTING FILE LIST | |
|       SETTING FILE NAME | PATH TO SETTING FILE STORAGE DESTINATION |
|       SETTING FILE DISPLAY NAME | SETTING FILE DISPLAY NAME |
|       ENCRYPTION FLAG | WHETHER FILE HAS BEEN ENCRYPTED |
|       CHECK TYPE | CHECK KEY ON PLAINTEXT? |
|       KEY | LIST OF KEYS TO BE CHECKED |

FIG.3E

| KEY | VALUE |
|---|---|
| TRANSMISSION HISTORY | |
|   APPLICATION NAME | APPLICATION NAME |
|   VERSION | VERSION |
|   SETTING FILE NAME | PATH TO SETTING FILE STORAGE DESTINATION |
|   LAST TRANSMISSION FILE PATH | PATH TO SETTING FILE LAST TRANSMITTED |
|   DEVICE LIST | |
|     DEVICE ID | DEVICE ID |
|     DEVICE NAME | DEVICE NAME |
|     IP ADDRESS | IP ADDRESS |
|     TRANSMISSION DATE AND TIME | TRANSMISSION DATE AND TIME |
|     TRANSMISSION RESULT | TRANSMISSION RESULT |
|     MESSAGE | (N/A) |

FIG.4

(1) SETTING FILE (PLAINTEXT) UNIQUE TO APPLICATION
TO BE TRANSMITTED
DESCRIBED IN [KEY=VALUE] FORMAT.

(2) SETTING FILE (ZIP FORMAT) UNIQUE TO APPLICATION
TO BE TRANSMITTED
DESCRIBED IN [KEY=VALUE] FORMAT.

(3) SETTING FILE (3DES-ENCRYPTED FILE) UNIQUE TO APPLICATION
TO BE TRANSMITTED
DESCRIBED IN [KEY=VALUE] FORMAT.

(4) AUTHENTICATION TABLE FILE
USER DATA INFORMATION IS DESCRIBED IN CSV FORMAT.

THE FILES (1) THROUGH (4) ARE TO BE RESTORED INTO PLAINTEXT
BY SETTING FILE TRANSMISSION TOOL BEFORE TRANSMISSION. THEN,
IT IS DETERMINED WHETHER THE FILES ARE APPROPRIATE AS FILES
TO BE TRANSMITTED. IF IT IS DETERMINED THAT THE FILES ARE
APPROPRIATE AS FILES TO BE TRANSMITTED, THEN THE FILES ARE
TRANSMITTED.

INFORMATION PROCESSING APPARATUS, INFORMATION TRANSMISSION METHOD, AND CONTROL PROGRAM THEREFOR

BACKGROUND OF THE INVENTION

1. Field of the Invention

The present invention relates to an information processing apparatus configured to communicate with an image forming apparatus allowing an application program to be installed thereon.

2. Description of the Related Art

Conventionally, in most cases, software for an image processing apparatus is installed on a real-time operating system (hereinafter referred to as an "RTOS") as static and fixed firmware. If such firmware includes a plurality of modules, such firmware is stored in a non-volatile memory of an image processing apparatus while being statically linked, as a whole, to a single load module.

When the ROTS is activated, such firmware is loaded from a non-volatile memory, such as a hard disk, onto a random access memory (RAM) to be executed or is executed directly on a non-volatile memory, such as a read-only memory (ROM).

In an image processing apparatus discussed in Japanese Patent Application Laid-Open No. 11-282684 and Japanese Patent Application Laid-Open No. 2003-256216, another software operation environment is provided on and in addition to an RTOS of firmware for a built-in system. Thus, an image processing apparatus discussed in Japanese Patent Application Laid-Open No. 11-282684 and Japanese Patent Application Laid-Open No. 2003-256216 supports dynamic characteristics of software, such as dynamic loading, dynamic linking, and dynamic memory operation, in the additionally-provided software operation environment.

Furthermore, Japanese Patent Application Laid-Open No. 11-53132 discusses a method using an application-download type printer containing a network computer. The method discussed in Japanese Patent Application Laid-Open No. 11-53132 downloads a data file to be printed and an application program compliant with the data file from a computer network onto the printer. Furthermore, the method discussed in Japanese Patent Application Laid-Open No. 11-53132 activates the application program on the network computer to open the data file and convert the data file into a raster image. Japanese Patent Application Laid-Open No. 11-53132 further discusses a network computer-installed printer, which prints the data file, and a computer network system including the printer. Moreover, Japanese Patent Application Laid-Open No. 11-53132 discusses a method using "Java® applet" as the application program.

Japanese Patent Application Laid-Open No. 2002-287990 discusses a method for installing an application on a device by accessing the device via a web browser and uninstalling the installed application therefrom. However, in a case where a plurality of image forming apparatuses exists on a network and an application program is to be introduced and installed on each of the plurality of image forming apparatuses, the following problems may arise.

That is, an administrator of the system may bear a heavy burden to install an application program on each image forming apparatus. Furthermore, considerable time may be required to install an application program on all of the image forming apparatuses.

Furthermore, in a case where the application program was installed on all of the image forming apparatuses, in order to use the installed application program under a business environment, it is necessary to perform settings for each application program.

In this regard, in performing a setting for the application program installed on an image forming apparatus, it is necessary for an administrator to know what type of application program was installed on which image forming apparatus on the network. The same applies in the case of changing the settings after installation of the application program.

Moreover, it is necessary for an administrator to know what type of application program is installed on which image forming apparatus on the network. In addition, it is necessary for an administrator to select each image forming apparatus, which is a setting file transmission destination, and to perform processing for transmitting a setting file to each selected image forming apparatus. As described above, with the conventional method described above, an administrator may be required to bear a heavy burden.

SUMMARY OF THE INVENTION

The present invention is directed to an information processing apparatus configured to allow a user to easily extract an image forming apparatus that has been installed with an application program that is a target of transmitting a setting file. More specifically, the present invention is directed to an information processing apparatus configured to allow a user to transmit a setting file for an application program to an appropriate image forming apparatus with a simple operation.

According to an aspect of the present invention, an information processing apparatus configured to transmit setting information used in an application program that operates on an image forming apparatus to the image forming apparatus includes an acquisition unit configured to acquire, from a plurality of image forming apparatuses, application information indicating a type of each application program installed on the plurality of image forming apparatuses, an application selection receiving unit configured to receive selection of an application program corresponding to the application information acquired by the acquisition unit, a setting information selection receiving unit configured to receive selection of setting information used in the application program whose selection has been received by the application selection receiving unit, an apparatus selection receiving unit configured to receive selection of an image forming apparatus as a destination to which to transmit the setting information from among image forming apparatuses installed with the application program whose selection has been received by the application selection receiving unit, and a transmission control unit configured to control processing for transmitting, to the image forming apparatus whose selection has been received by the apparatus selection receiving unit, the setting information whose selection has been received by the setting information selection receiving unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 2 illustrates an example of a hardware configuration of the network system according to an exemplary embodiment of the present invention.

FIGS. 3A through 3E each illustrate an example of a list of files managed on a personal computer (PC) according to an exemplary embodiment of the present invention.

FIG. 4 illustrates an example of types of setting files to be transmitted according to an exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
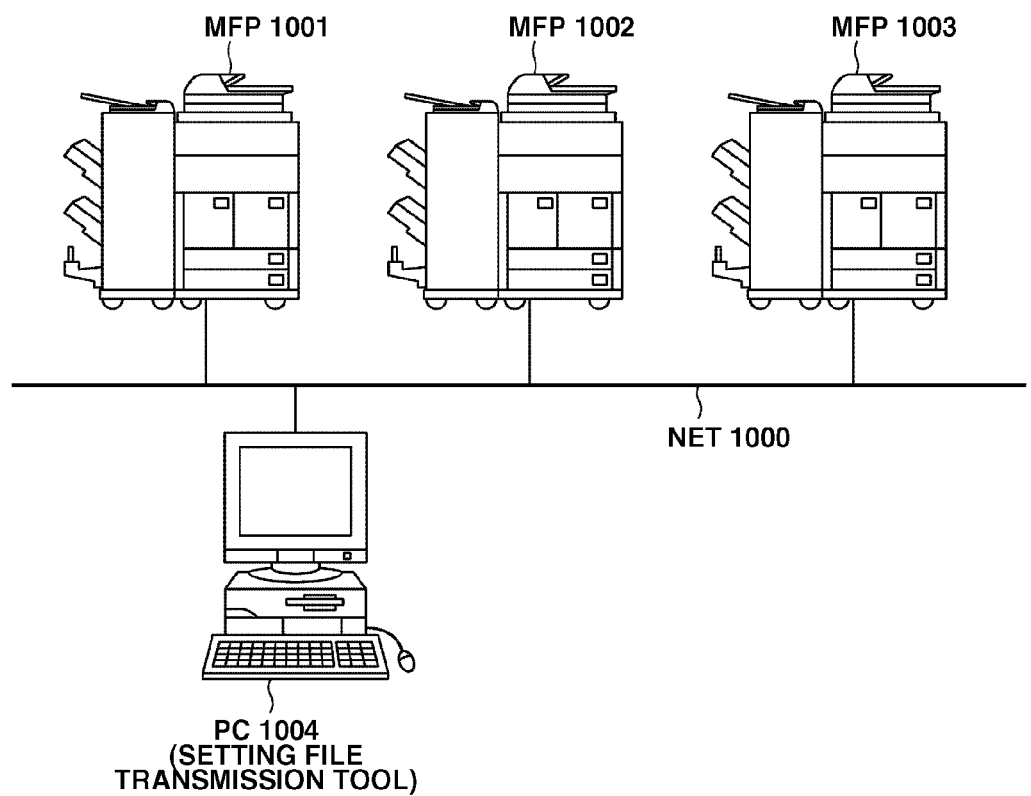
FIG. 1 illustrates an example of a configuration of a network system according to an exemplary embodiment of the present invention.

A first exemplary embodiment of the present invention will be described below. FIG. 1 illustrates an example of a configuration of a network system according to an exemplary embodiment.

Referring to FIG. 1, a PC 1004, which is an example of an information processing apparatus, stores and executes a setting file transmission tool.

An MFP 1001 is an example of an image forming apparatus having various functions, such as a facsimile transmission function, a copying function, and a function as a printer. An MFP 1002 and an MFP 1003 respectively have substantially similar functions as those of the MFP 1001 except for installed applications and a stored setting file.

A network (NET) 1000 is an example of a communication medium. The PC 1004 and each of the MFPs 1001 through 1003 can transmit various information and perform data communication via the NET 1000.

FIG. 2 illustrates an example of a software configuration of the PC 1004 and each of the MFPs 1001 through 1003 in FIG. 1 according to an exemplary embodiment.

Prerequisites for an environment of each of the MFPs 1001 through 1003 will be described below with reference to FIG. 2. An application platform 2009 (hereinafter simply referred to as a "platform") is an additionally-provided software operation environment. The application platform 2009 is implemented on a Real Time Operating System (RTOS) 2010.

The platform 2009 includes an interpreter, a group of application programming interfaces (hereinafter referred to as "APIs"), and a group of frameworks. The platform 2009 provides a pseudo-operating system (OS) or a computing platform for software operating on the platform 2009.

The interpreter successively reads, interprets, and executes a series of command lines including commands included in a predetermined command set. In the case where the command set is used in the same manner as a command set for a central processing unit (CPU) of hardware, the interpreter is especially called a "virtual machine".

The APIs and the frameworks provide an access to a resource provided by an actual RTOS existing in a lower layer of the software operation environment or to various resources obtained by abstraction of hardware resources, for software operating under the software operation environment. The resources include a context for executing a command by a processor, a memory, a file system, and various input and output units (I/Os), such as a network interface.

Here, with respect to the command execution context, the software operation environment can manage the command execution context on the interpreter, regardless of a multi task mechanism provided by an actual CPU and RTOS. With respect to the memory, the software operation environment can independently manage the memory.

The software operating on the platform is serially read, interpreted, and executed by the interpreter. Thus, the command line can be monitored during the processing by the interpreter, which can suppress occurrence of an operation that may affect the operation of the system. Furthermore, with respect to the access from the software on a software execution environment to various resources, an access operation that may affect the operation of the system can be suppressed because the resources are indirectly operated via the APIs and the group of frameworks provided by the platform.

Accordingly, an approach of providing in firmware an interpreter and a layer of an environment for executing software including the APIs and the group of frameworks is very useful in partially introducing dynamic software characteristics on firmware in a low-cost built-in system, which is basically required to be statically and fixedly configured.

On the platform 2009, an application 1 2005 and an application 2 2006 are provided. The application 1 2005 and the application 2 2006 are executed using an API of the platform 2009.

A setting file transmission tool 2001 is a program for transmitting a setting to the MFPs 1001 through 1003 and operates on an object code execution environment.NET 2003.

Furthermore, the PC 1004 includes an OS 2004. The MFPs 1001 through 1003 include the application 1 2005 and the application 2 2006, which operate on the application platform 2009. The application 1 2005 and the application 2 2006 can be a FeliCa authentication application, which will be described below. Furthermore, the MFPs 1001 through 1003 include a file receiving module 2007. The file receiving module 2007 has a function for receiving a setting file from the setting file transmission tool 2001.

Moreover, the MFPs 1001 through 1003 include an application management module 2008. The application management module 2008 manages a status of the application 1 2005, the application 2 2006, and the file receiving module 2007 and manages a life cycle of the applications 2005 through 2007, such as activation and suspension thereof.

Each file utilized by a program for transmitting a setting file used by the application program according to an exemplary embodiment will be described with reference to FIGS. 3A through 3E. In the present exemplary embodiment, the file is described in eXtensible Markup Language (XML) format. The type and the main content of the file will be described below.

[Device List File]

Figure 5:
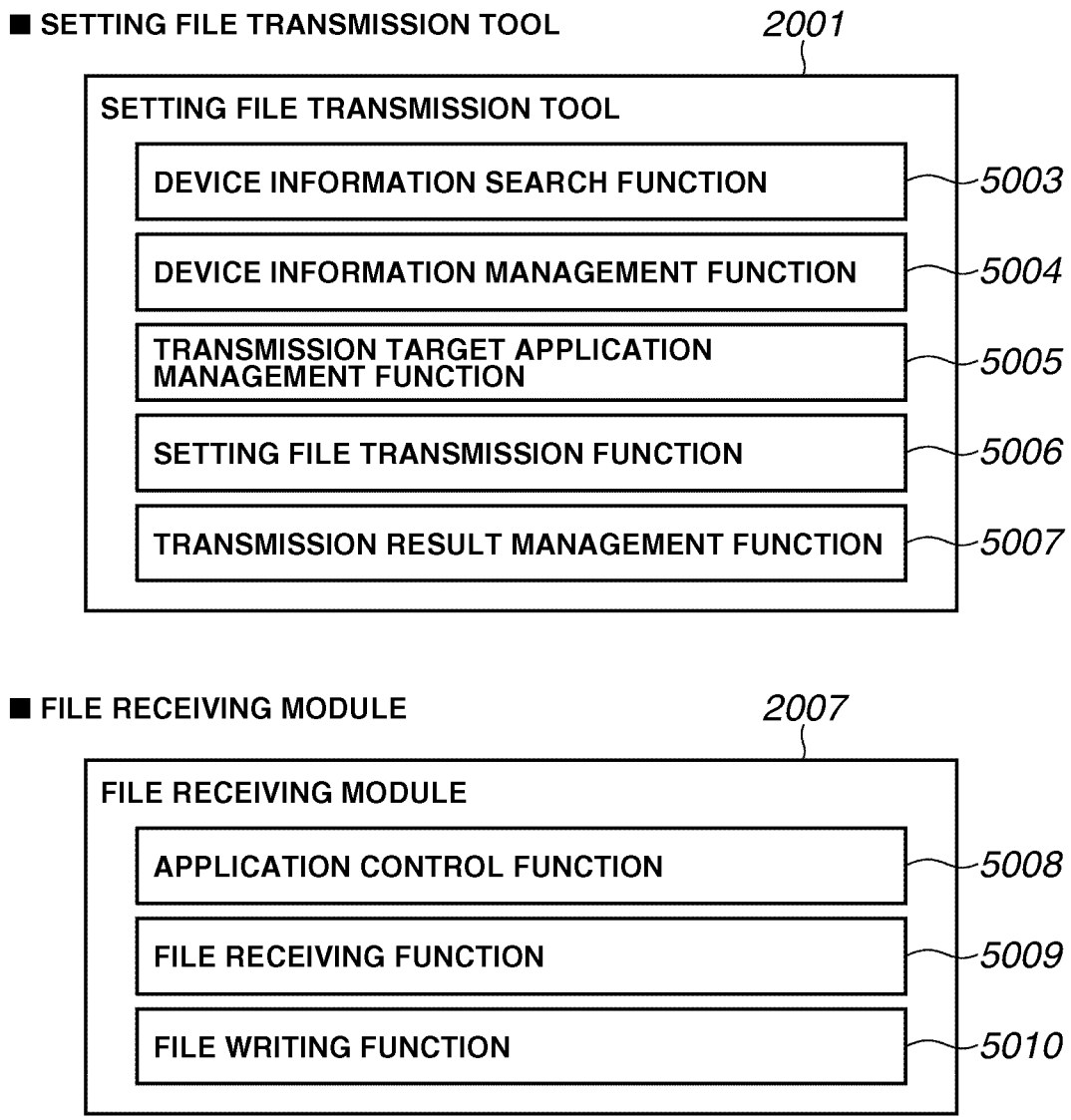
FIG. 5 illustrates an example of a functional configuration of the system according to an exemplary embodiment of the present invention.

A device list file includes information about a device detected on the network using a device information search function 5003 (FIG. 5). The device information includes data items and values therefor, as illustrated in FIG. 3A.

The data items primarily include a device detection mode, a device status, an update date and time, a port number, a device ID, device unique information (MAC address, an IP address, a serial number, and a product name), firmware information, a device name, a device spec ID, and installed application information. The installed application information is especially significant in the present exemplary embodiment.

The installed application information indicates an installed application program (hereinafter simply referred to as an "application"), which has already been installed on the image forming apparatus. More specifically, the installed application information includes an application ID, an application version, an application name, an installation date and time, an application status, and an application type. The installed application information further includes a presence or absence of license and a license status, as license information.

The information processing apparatus (setting file transmission tool) issues a request to the image forming apparatus for sending a device list file. Thus, the information processing apparatus can acquire the device list file from the image forming apparatus. The information processing apparatus refers to the received device list file to recognize and manage what type of application program has been installed on each of the MFPs 1001 through 1003.

[Group List File]

A group list file (FIG. 3B) includes information about a device group. The group list file is generated inside the information processing apparatus to be managed therein. The group list file describes a group name, a group description, and a device list (a device name and a device ID). The information processing apparatus can manage the MFPs 1001 through 1003 as a group.

[Application List File]

An application list file (FIG. 3C) describes application information sent from the image forming apparatus on the network. The application list file is generated inside the information processing apparatus to be managed therein. The application list file describes an application ID, an application version, an application name, an application type, and license information, as the application information acquired by referring to the device list file. An administrator can further include in the application list file an application description and information about each resource.

[Transmission Target Application File]

A transmission target application file (FIG. 3D) includes information about an application program to which the information processing apparatus transmits a setting file therefor, an application version, and information about a file to be transmitted. The transmission target application file is previously generated inside the information processing apparatus to be managed therein.

[Transmission History File]

A transmission history file (FIG. 3E) is a history file describing a result of control by the information processing apparatus for transmitting a setting file. The transmission history file is generated when transmission control is performed by the information processing apparatus, to be thereafter managed, as will be described in detail below. The PC 1004 (FIG. 1) is an example of the information processing apparatus.

FIG. 4 illustrates an example of types of setting files to be transmitted according to an exemplary embodiment.

As illustrated in FIG. 4, the PC 1004 can transmit the following four types of setting files to the image forming apparatus.

(1) A setting file (in a plaintext format) unique to a transmission target application.

The setting file (in a plaintext format) unique to a transmission target application is described in a [KEY=VALUE] format.

(2) A setting file (in a ZIP format) unique to a transmission target application.

The setting file (in a ZIP format) unique to a transmission target application is described in a [KEY=VALUE] format.

(3) A setting file (3DES-encrypted file) unique to a transmission target application.

The setting file (3DES-encrypted file) unique to a transmission target application is described in a [KEY=VALUE] format.

(4) An authentication table file.

The authentication table file includes user data information described in a comma separated value (CSV) format.

When the PC 1004 has selected any of the above files (1) through (4) as a file to be transmitted, that file is restored into a plaintext format. Then, it is determined whether the file is appropriate as a file to be transmitted. If it is determined that the file is appropriate as a file to be transmitted, then the PC 1004 transmits the file. More specifically, the determination as to whether the file is appropriate as a file to be transmitted is performed by determining whether a required license key is provided to the transmission target application installed on the MFP.

FIG. 5 illustrates an example of a functional configuration of the PC 1004 (setting file sending apparatus) and the MFPs 1001 through 1003 (setting file receiving apparatuses) related to the setting file transmission processing according to an exemplary embodiment.

Referring to FIG. 5, the setting file transmission tool 2001 of the PC 1004 (setting file sending apparatus) includes a device information search function 5003, a device information management function 5004, a transmission target application management function 5005, a setting file transmission function 5006, and a transmission result management function 5007.

The device information search function 5003 is a function for searching for an MFP on the network and acquiring the device information from the detected MFP. The device information management function 5004 is a function for generating a device list file for each of the MFPs 1001 through 1003 based on the acquired device information and managing the generated device list file.

The transmission target application management function 5005 is a function for generating an application list file based on the application information acquired from the MFPs 1001 through 1003 and managing the generated application list file and a previously-generated transmission target application file.

The setting file transmission function 5006 is a function for transmitting a setting file that has been designated by a user to an MFP that has been designated by the user. The transmission result management function 5007 is a function for generating a transmission history file describing a result of transmission processing performed using the setting file transmission function 5006 and managing the generated transmission history file.

The file receiving module 2007 of the MFP (setting file receiving apparatus) includes an application control function 5008, a file receiving function 5009, and a file writing function 5010.

The application control function 5008 is a function for activating an installed application, acquiring information about a storage destination (a directory or a file path) of the application by communicating with the application, and exiting from the application. The file receiving function 5009 is a function for performing a data communication by establishing a session with the information processing apparatus to receive a setting file. The file writing function 5010 is a function for writing the setting file sent from the information processing apparatus to the storage destination of the setting file, whose information has been acquired from the application by communicating therewith.

Figure 6:
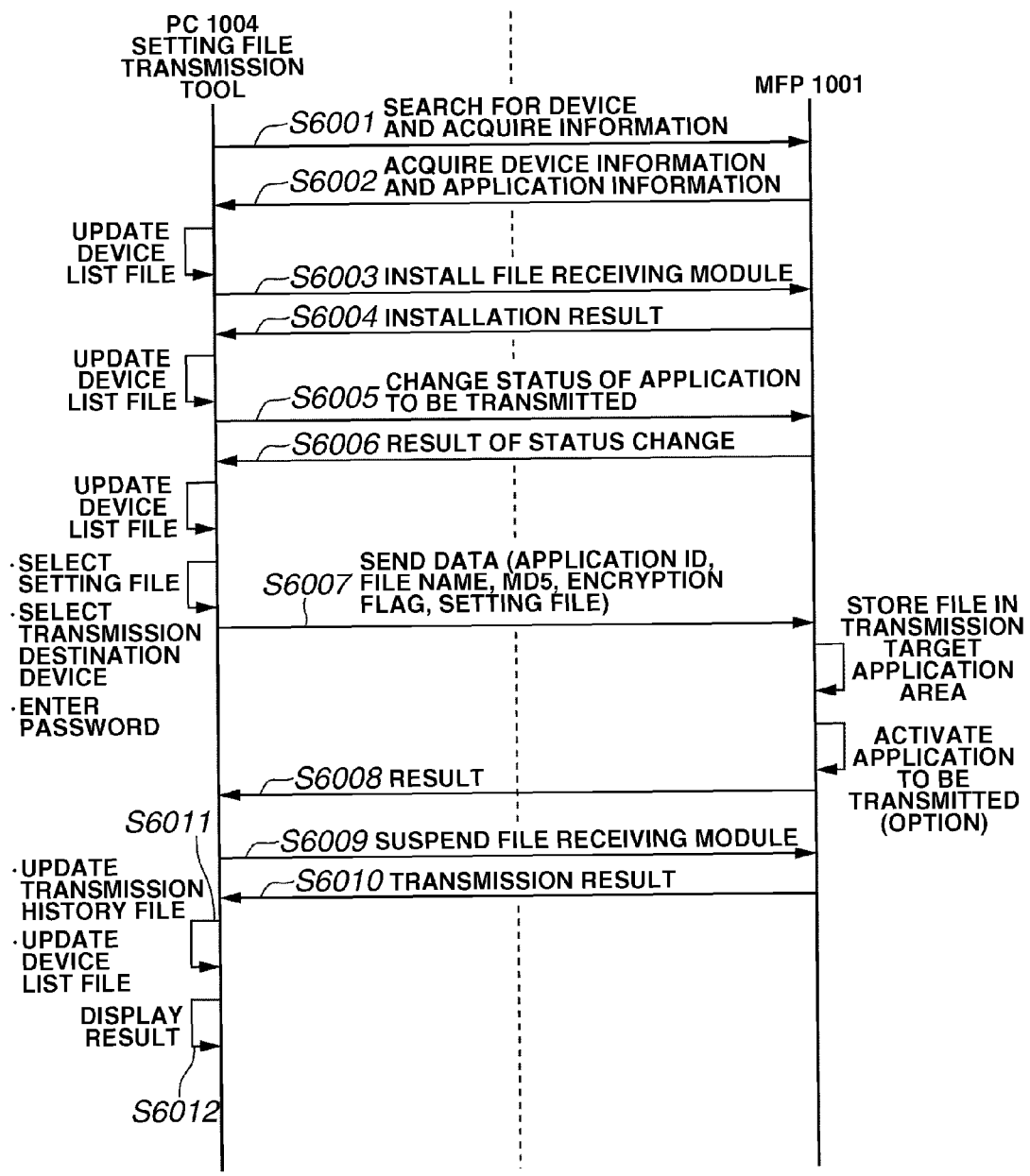
FIG. 6 illustrates an example of a sequence performed between a PC and a multifunction peripheral (MFP) according to an exemplary embodiment of the present invention.

FIG. 6 illustrates an example of a sequence of processing performed by the PC 1004 and the MFP 1001 according to an exemplary embodiment. Here, it is to be noted substantially similar processing illustrated in FIG. 6 can be performed between the PC 1004 and each of the MFP 1002 and the MFP 1003.

Referring to FIG. 6, in step S6001, the setting file transmission tool 2001 issues a request for acquiring device information to the PC 1004 using a predetermined search protocol. After receiving the device information acquisition request from the setting file transmission tool 2001, the PC 1004 executes the device information search function 5003 to perform the processing of step S6001.

In step S6002, the MFP 1001 sends device information and application information to the PC 1004. More specifically, the MFP 1001 sends the information illustrated in FIG. 3A to the PC 1004 via the NET 1000. The setting file transmission tool 2001 of the PC 1004 updates the device list file using the information acquired in step S6002.

In step S6003, the setting file transmission tool 2001 transmits the file receiving module 2007 to the MFP 1001 and instructs the MFP 1001 to install the transmitted file receiving module 2007 thereon. A modification related to the above processing will be described below.

In step S6004, the MFP 1001 sends an installation result to the PC 1004. The setting file transmission tool 2001 updates the device list file based on the received installation result.

In this regard, for example, when the file receiving module 2007 is successfully installed on the MFP 1001, the setting file transmission tool 2001 writes information describing that the file receiving module 2007 has been successfully installed on the MFP 1001 into an entry for the MFP 1001 in the device list file. On the other hand, if the file receiving module 2007 has not been successfully installed on the MFP 1001, the setting file transmission tool 2001 writes information describing that the file receiving module 2007 has not been successfully installed on the MFP 1001 in an entry for the MFP 1001 in the device list file. The above information can be displayed on a display of the PC 1004.

In step S6005, the setting file transmission tool 2001 sends a command for changing a status of the transmission target application to the application in the MFP 1001. For example, the setting file transmission tool 2001 issues an instruction for suspending a service currently run by the application for reading the setting file.

In step S6006, the MFP 1001 sends a result of the status change to the PC 1004. For example, the MFP 1001 sends to the PC 1004 a result indicating that the service has not been successfully suspended or that the service has been successfully suspended. After step S6006, the device list file is updated and at least one setting file is selected at the PC 1004.

In step S6007, an application ID, a file name, an MD5 encryption flag, and a setting file are sent from the PC 1004 to the MFP 1001. After step S6007, the transmitted files are stored in a target application area. Optionally, an application to be transmitted is activated in the MFP 1001. In step S6008, a result is transmitted from the MFP 1001 to the PC 1004. Then, in step S6009, an instruction for suspending a file receiving module is sent from the PC 1004 to the MFP 1001. In step S6010, a transmission result is transmitted from the MFP 1001 to the PC 1001.

Figure 7:
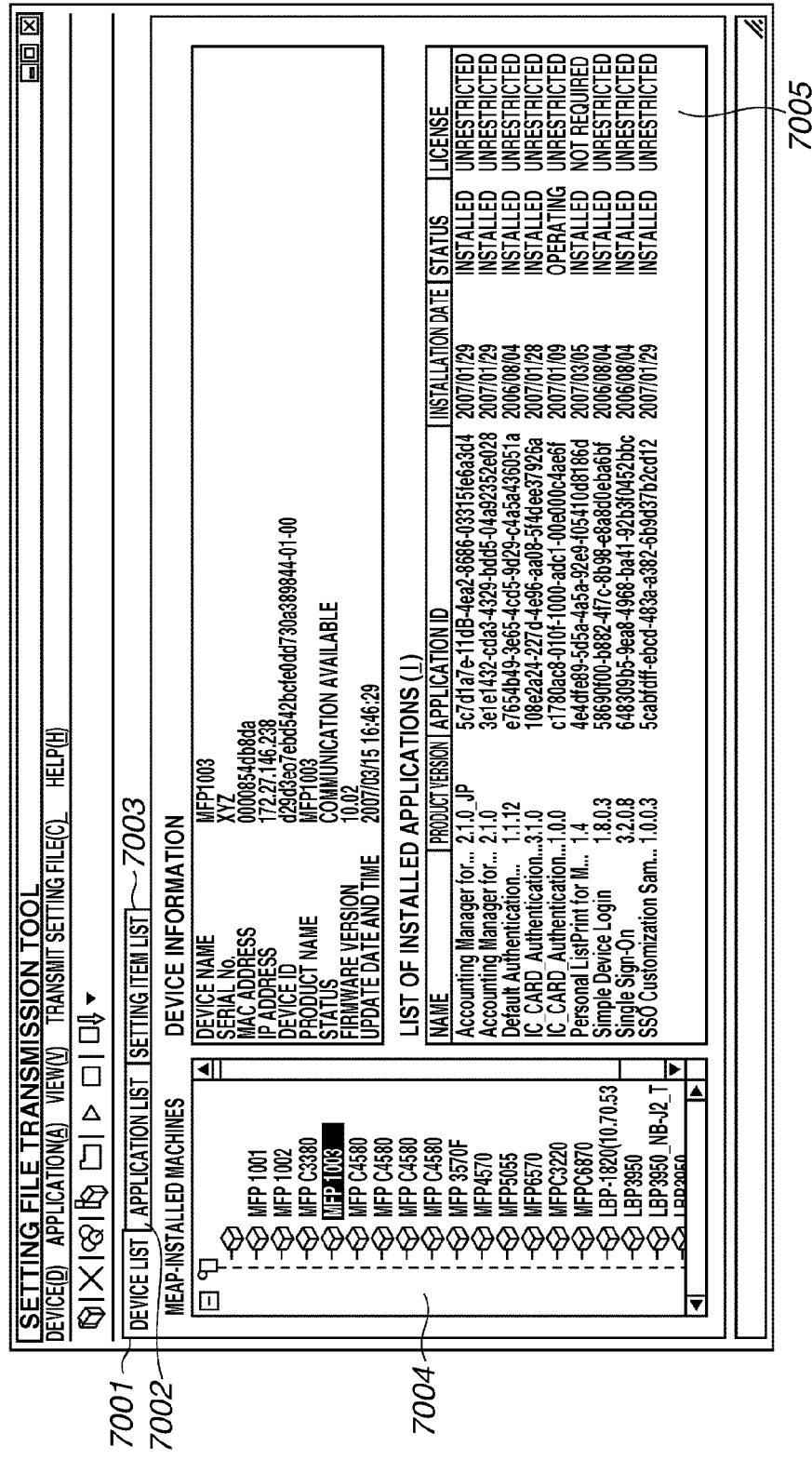
FIG. 7 illustrates an example of a display screen provided by a setting file transmission tool and displayed on a PC according to an exemplary embodiment of the present invention.

FIG. 7 illustrates an example of a display screen of the PC 1004 provided by the setting file transmission tool 2001 according to an exemplary embodiment. The display screen includes a device list screen 7004.

The device list screen 7004 is displayed when the user selects a device list tab 7001 or immediately after the setting file transmission tool 2001 is activated. When the setting file transmission tool 2001 is activated, the setting file transmission tool 2001 performs the processing in steps S6001 through S6004 and updates the device list file.

In the device list screen 7004, all of the MFPs whose information has been acquired in step S6001 and step S6002 via the network are displayed as a list. Here, the MFPs 1001 through 1003 are included in the list of MFPs displayed on the device list screen 7004.

When the user arbitrarily selects the MFP 1003 in the device list, applications already installed on the selected MFP 1003 are displayed as a list in an installed application list field 7005. The displayed installed application list is based on the device information (particularly, the application information described therein) acquired from the MFPs 1001 through 1003.

That is, the user can recognize and find the applications installed on the selected device, using the device on the network as a key. More specifically, when the user selects the MFP 1003, the PC 1004 extracts the information related to the installed applications (i.e., information such as an application name) from the device list file (FIG. 3A), which has been previously acquired, and then displays the extracted information.

As illustrated in FIG. 7, it can be known that an IC Card Authentication FeliCa Ver. 3.10 and Ver. 1.10 application are installed on the MFP 1003, although the name of the installed application is partially abbreviated in FIG. 7.

Figure 8:
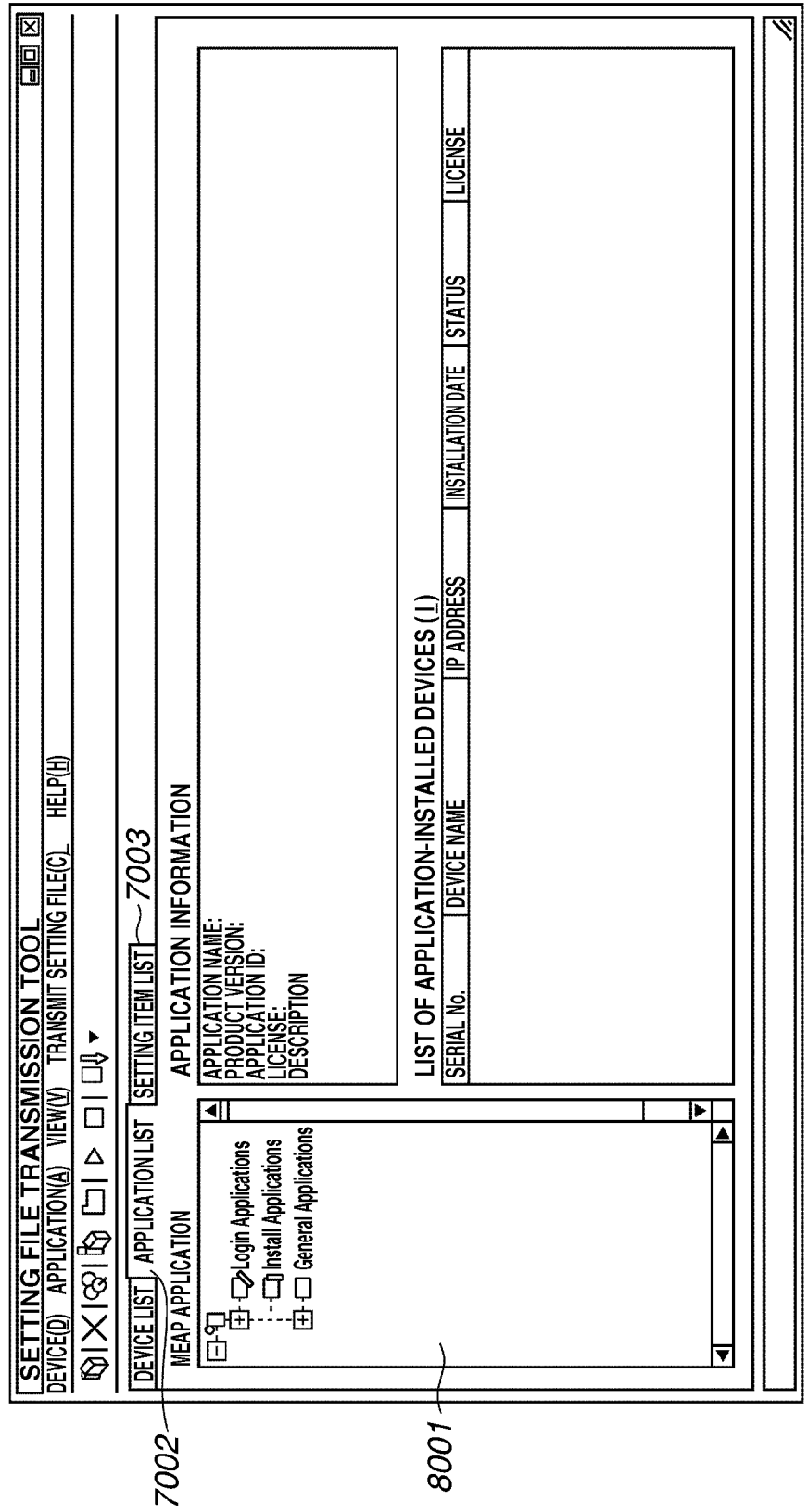
FIG. 8 illustrates an example of a display screen provided by the setting file transmission tool and displayed on a PC according to an exemplary embodiment of the present invention.

FIG. 8 illustrates an example of a display screen provided by the setting file transmission tool 2001, which is displayed on the information processing apparatus, according to an exemplary embodiment. The display screen in FIG. 8 is an application list screen.

When the user selects or presses an "application list" tab 7002, the application list screen is displayed based on a content of the application list file stored by the device information management function 5004. The applications are displayed as any of three types of applications, namely, a login application, an install application, or a general application, based on a value for the application type stored in the application list file.

When the user selects an application name displayed in a pane 8001 (displayed in a leftmost portion of the screen), information about the selected application is acquired from among the application list in FIG. 3C, and then the acquired application information is displayed in an upper-right portion of the screen.

In a lower-right display field of the screen, a list of MFPs on which the currently selected application has already been installed is displayed, whose information can be acquired with reference to the device list file.

That is, the user can recognize and find the MFP on which the selected application has already been installed, using the application as a key. More specifically, the application list (FIG. 3C) is previously provided on the PC 1004, and the PC 1004 displays the applications in the application list in the pane 8001. When the user selects any of the displayed applications, the PC 1004 can extract an MFP on which the application in the device list (FIG. 3A) has been installed and can display the extracted MFP, using the selected application as a key.

Figure 9:
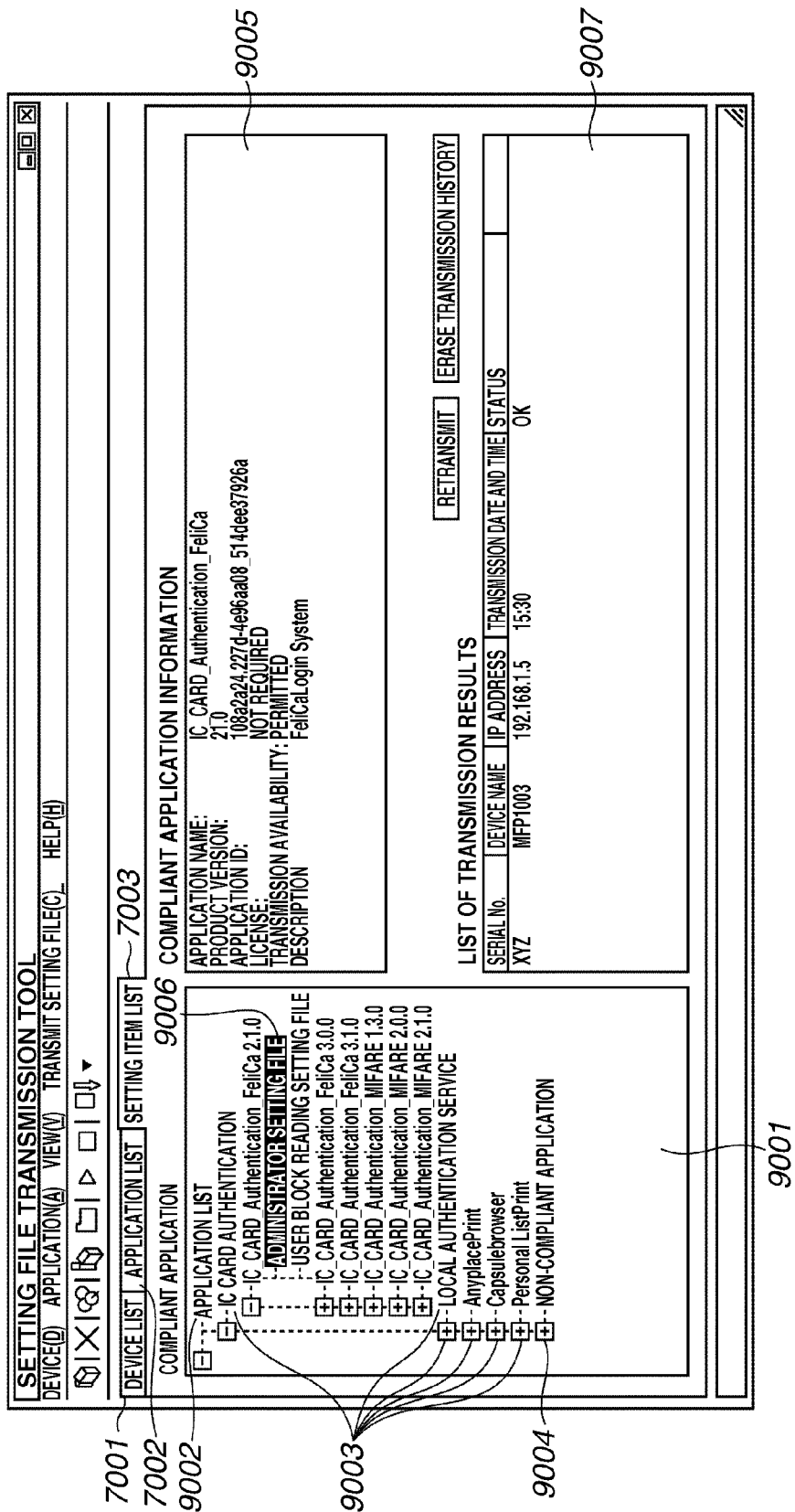
FIG. 9 illustrates an example of a display screen provided by the setting file transmission tool and displayed on the PC according to an exemplary embodiment of the present invention.

FIG. 9 illustrates an example of a display screen provided by the setting file transmission tool 2001, which is displayed on the PC 1004, according to an exemplary embodiment. The display screen in FIG. 9 is a setting item list screen.

When the user presses a "setting item list" tab 7003, the setting item list screen displays contents of the application list file (FIG. 3C) classified based on information about a transmission target application. Using an application that uses a setting file to be transmitted as a key, the setting item list screen displays a list of MFPs on which the application that uses the setting file to be transmitted has been installed.

Thus, the user can easily select an MFP (transmission destination) from among the MFPs that have been installed with the selected application displayed in the application list. That is, when the user selects the setting file, the setting file transmission tool 2001 detects the selected setting file. Then, the setting file transmission tool 2001 acquires a name of a path to the detected setting file.

Then, the setting file transmission tool 2001 searches the transmission target application file (FIG. 3D) to determine which application name the path name of the setting file corresponds to. When the application name is determined, the setting file transmission tool 2001 serially searches the installed application information (FIG. 3A), using the determined application name as a key, to identify a name of the device on which the application having the determined application name is installed.

Here, a plurality of device names can be determined. In FIG. 9, the MFP 1003 installed with the IC card authentication FeliCa Ver. 3.0 (FIG. 7), which is upwardly compatible with IC card authentication FeliCa Ver 2.10, has been determined.

Rules for displaying the setting items on the setting item list screen (FIG. 9) is as follows.

As a rule 1, with respect to a setting for a top tree, the "application list" is fixedly displayed on a top tree node of "compliant application".

As a rule 2, with respect to a major item 9002, the major item tree field displays an "application name" (in Japanese characters) of a setting file transmission target application. With respect to the application name to be displayed, an "application display name" of the "compliant application file" is set. In a bottom layer, a "non-compliant application" is fixedly displayed.

As a rule 3, with respect to a medium item 9003, the medium item tree field displays an "application name (bundle)" and an "application version". An application version that is not a setting file transmission target is displayed and controlled in the following manner.

With respect to a lower-order version application, the "application name" and the "application version" are grayed out, indicating that the application version is not the target of the setting file transmission. With respect to a higher-order version, the "application name" and the "application version" are effectively displayed to indicate that the application version is the target of the setting file transmission.

The content of checking performed when the setting file to be transmitted is selected is based on a latest version that has been registered as a compliant application. In determining whether an application version is a higher-order version or a lower-order version, an "earliest version" and a "latest version" of the application that has been registered in the transmission target application file (FIG. 3D) are compared with the version of the application that the setting file corresponds to.

As a rule 4, with respect to a minor item 9006, the minor item 9006 displays a "setting file name". The setting file name to be displayed corresponds to the application version of the "compliant application file". The setting file transmission tool 2001 acquires the setting file name and displays the acquired setting file name. A plurality of setting file names can be displayed.

As a rule 5, with respect to a non-compliant application tree 9004, the non-compliant application tree 9004 displays all the applications not existing in the "compliant application file" in a grayed-out state. When the user selects any of the application name displayed in the leftmost field of the screen, application information about the selected application is acquired from the application list file and then the acquired application information is displayed in the upper-right field 9005 of the screen. In a lower-right portion 9007 of the screen, a content of the transmission history file (FIG. 3E) is displayed.

That is, a pane 9001 (leftmost portion of the screen) displays a list of applications, and the upper-right field 9005 of the screen displays information about the selected application. A lower-right field 9007 displays history information about a result of a latest transmission of the selected setting file.

Via the screen in FIG. 9, the user can search for and transmit an application to which the selected setting file can be transmitted, from among the applications on the network. When a value "no good (NG)" is displayed as a result of a latest transmission, the user can retransmit the setting file by pressing a "retransmit" button. When a value "NG" is not displayed as a result of a latest transmission, the "retransmit" button is grayed out (the user cannot press the "retransmit" button).

Figure 10:
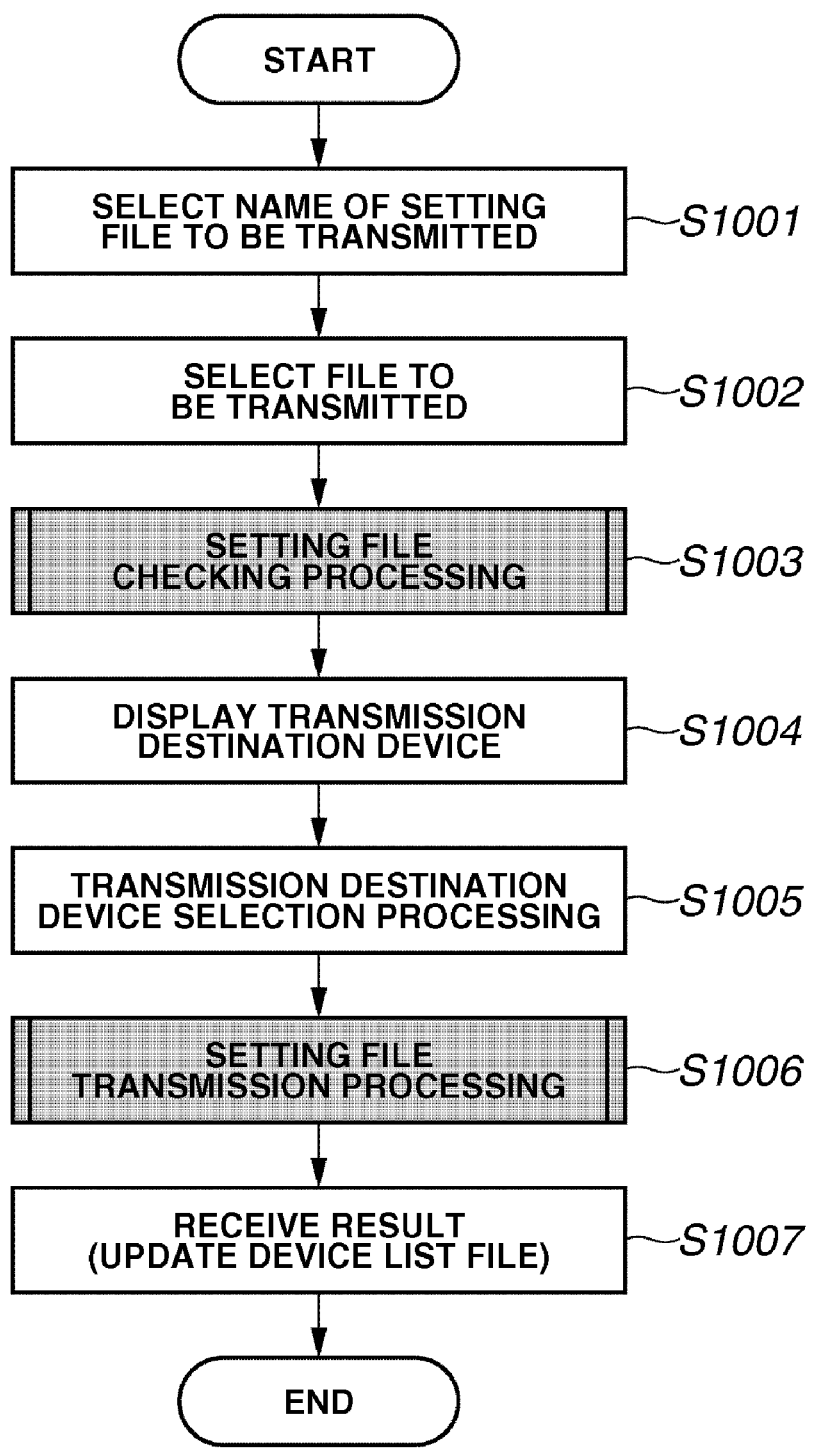
FIG. 10 is a flow chart illustrating an example of processing related to control of setting file transmission performed by a PC according to an exemplary embodiment of the present invention.

FIG. 10 is a flow chart illustrating an example of processing related to the control of setting file transmission performed by the information processing apparatus according to an exemplary embodiment.

Referring to FIG. 10, in step S1001, the setting file transmission tool 2001 receives selection of the file name of the file to be transmitted. Here, the setting file transmission tool 2001 detects that the "setting item list" tab 7003 (FIG. 7) has been selected by the user. Thus, the setting file transmission tool 2001 detects that the file name of the setting file to be transmitted has been selected by the user. More specifically, the user selects the item 9006 (FIG. 9).

Figure 11:
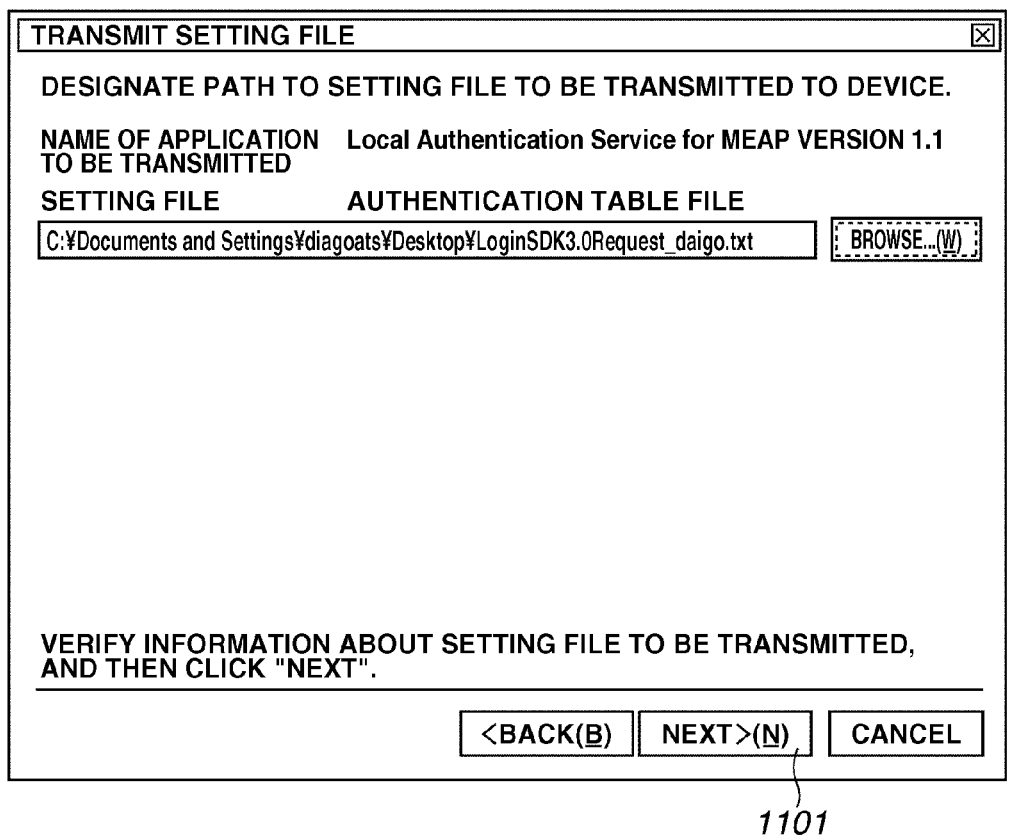
FIG. 11 illustrates an example of a display screen provided by the setting file transmission tool and displayed on a PC according to an exemplary embodiment of the present invention.

In step S1002, the setting file transmission tool 2001 detects that the setting file to be transmitted has been selected by the user from a tool bar via a screen illustrated in FIG. 11.

When the user selects the setting file name via a setting file selection screen (FIG. 11) and presses a "next" button 1101, the setting file transmission tool 2001 recognizes an application name of an application compliant with the selected setting file, an application version of the selected application, and the selected setting file to be transmitted. Then, the screen returns to the screen in FIG. 9.

In step S1003, the setting file transmission tool 2001 performs processing for checking the setting file. When the user presses the "next" button 1101, the processing in step S1003 starts.

More specifically, in step S1003, using the transmission target application management function 5005, the setting file transmission tool 2001 compares a content of the selected setting file with information about the setting file described in the transmission target application file to determine if the setting files match each other. In the case of an encrypted file, the setting file transmission tool 2001 decrypts the file and checks the content of the file using the transmission target application management function 5005.

If it is determined that the setting files do not match each other in step S1003, then the setting file transmission tool 2001 displays an error dialog using the transmission target application management function 5005. In this case, the setting file transmission tool 2001 cannot transmit a file with respect to which an error has been determined.

In the case where the selected application version is later than the version stored in the transmission target application list, in comparing the contents of the setting files, the setting file transmission tool 2001 uses information about an application included in the transmission target application list whose version is closest to the selected application version for comparison. Thus, the setting file transmission tool 2001 is not required to frequently update the list at every updating of an application.

When the processing in step S1003 is completed, a screen 2101 (FIG. 21) is displayed.

Figure 21:
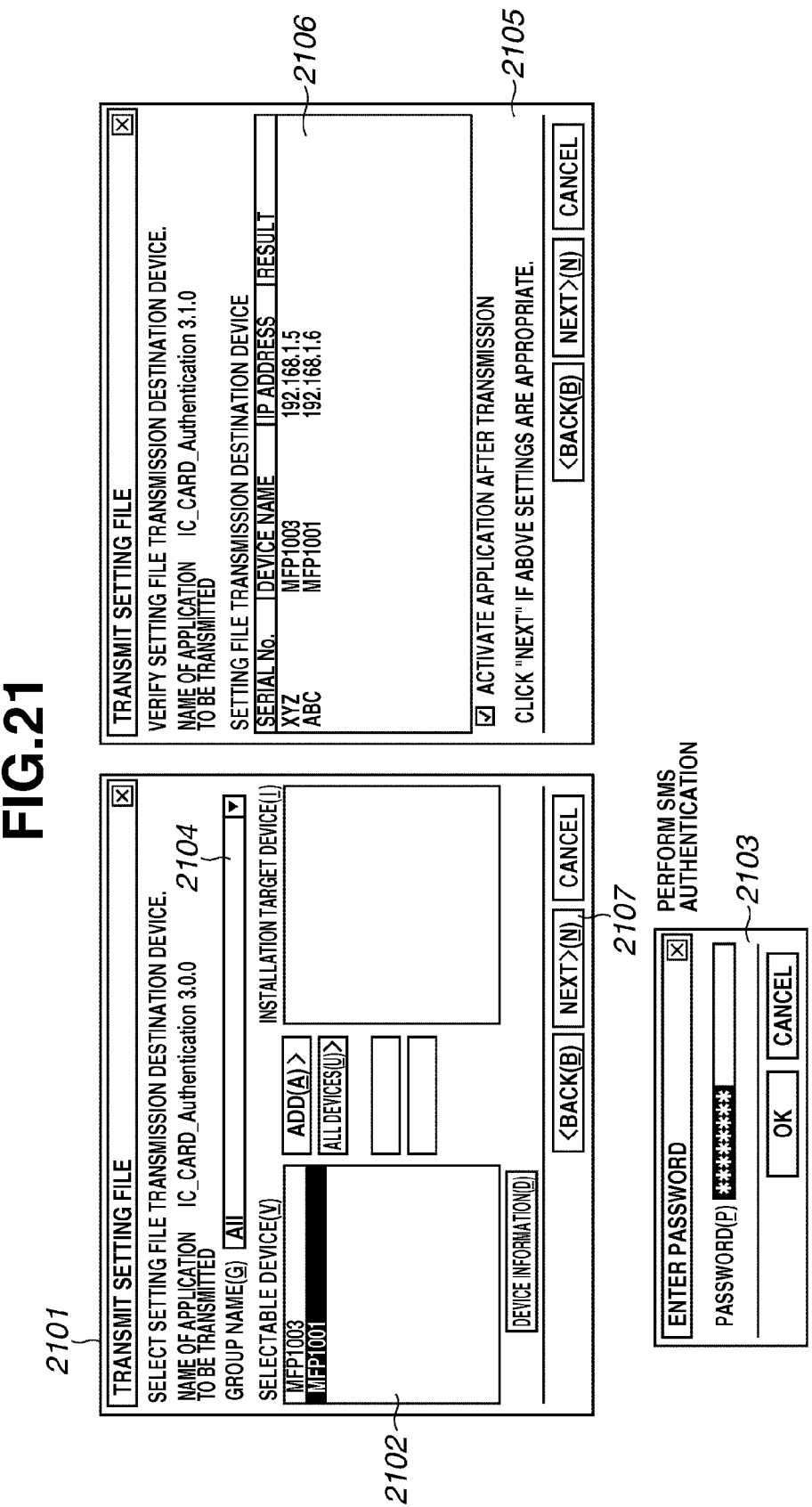
FIG. 21 illustrates an example of a display screen provided by the setting file transmission tool and displayed on a PC according to an exemplary embodiment of the present invention.

In step S1004, the setting file transmission tool 2001 performs processing for displaying the transmission destination device via the screen 2101 (FIG. 21). Here, the setting file transmission tool 2001 reads the selected file. In this processing, using the transmission target application management function 5005, the setting file transmission tool 2001 reads the device list file that has previously been acquired from the MFP. Further, the setting file transmission tool 2001, using the transmission target application management function 5005, displays a list of devices 2102 on which the selected application has been installed. Users can input a Service Management Service (SMS) password (described below) via a password dialog 2103.

When the user selects a group name 2104, the setting file transmission tool 2001, using the transmission target application management function 5005, reads the group list file to filter the device list to be displayed. That is, the setting file transmission tool 2001 extracts a device belonging to a specific group name from the device list file.

In step S1005, the setting file transmission tool 2001 performs processing for detecting a selected transmission destination device. In this processing, the user selects a device to which the setting file is to be transmitted, from among the list of devices to which the setting file can be transmitted. Here, the user is required to enter a password to select the device to which the setting file is to be transmitted. More specifically, the user is required to enter a Service Management Service (SMS) password registered on the device listed in the device list 2102.

When the user enters the SMS password, the setting file transmission tool 2001 communicates with the selected device using the device information management function 5004 to check if the entered SMS password is appropriate. If the user is not successfully authenticated with the entered SMS password, the setting file transmission tool 2001 does not determine that the selected device is the target of the setting file transmission.

In step S1006, the setting file transmission tool 2001 performs processing for transmitting a setting file. When the user presses the "next" button 2107 via the screen 2101, a screen 2105 (FIG. 21) is displayed. The screen 2105 displays a setting file transmission dialog 2106. The setting file transmission dialog 2106 displays a device to which the selected setting file can be transmitted. In this processing, the setting file transmission tool 2001 transmits the selected setting file to the file receiving module 2007 of the setting file transmission destination device.

In step S1007, the setting file transmission tool 2001 performs processing for receiving a transmission result. In this processing, the setting file transmission tool 2001 receives a transmission result from the file receiving module 2007. The setting file transmission tool 2001 updates the transmission history file based on the received transmission result.

If a transmission history of the selected setting file exists in the transmission history file, then the setting file transmission tool 2001 erases the existing transmission history and overwrites the transmission history with the received transmission result. Further, the setting file transmission tool 2001 updates the transmission result in the device list file. A "transmission result" includes information about a status of installation of an application on the device (success or failure of the install and the application version of the installed application).

Figure 12:
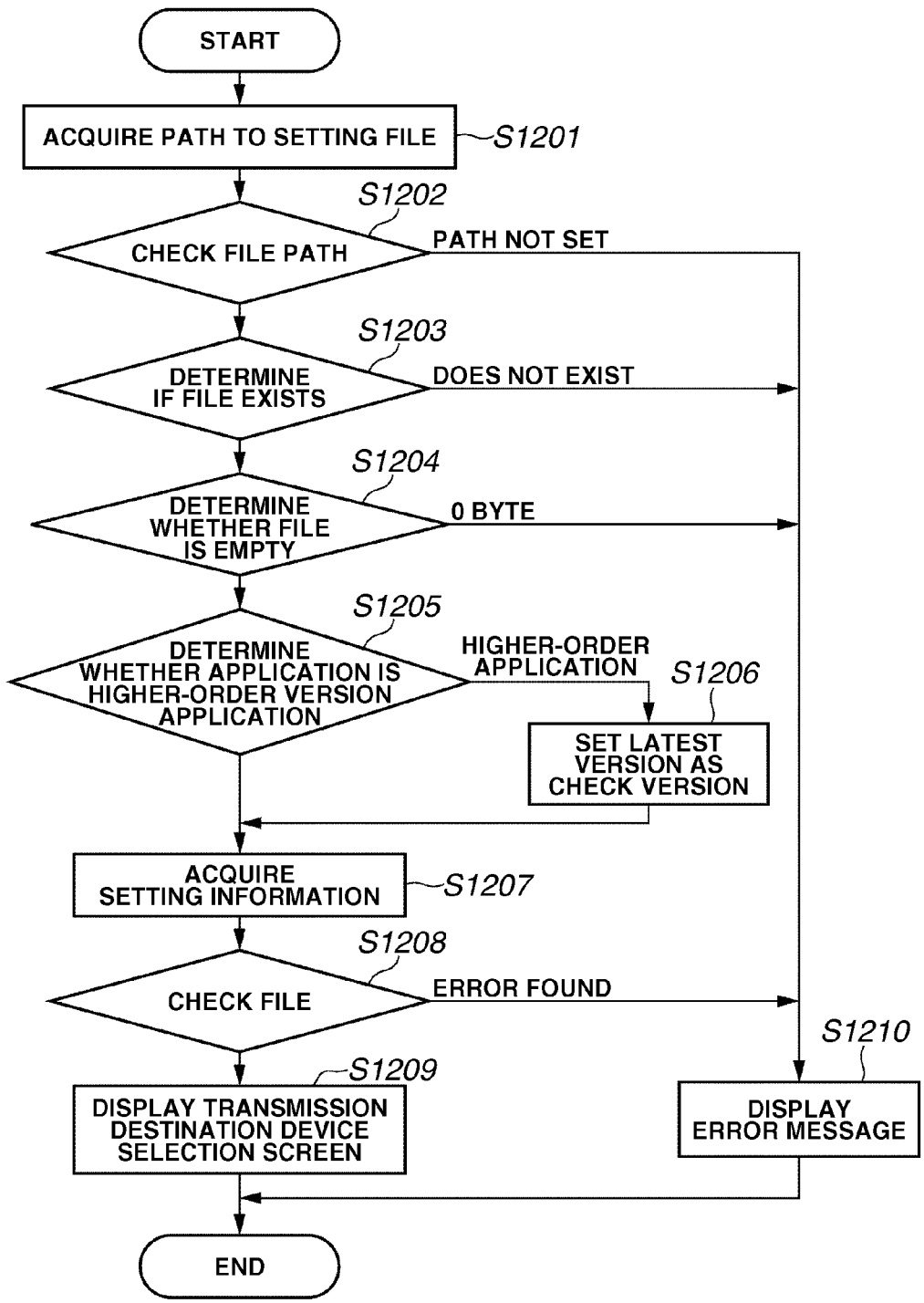
FIG. 12 is a flow chart illustrating an example of processing performed by a PC for checking a setting file according to an exemplary embodiment of the present invention.

FIG. 12 is a flow chart illustrating an example of processing performed by the information processing apparatus for checking a setting file according to an exemplary embodiment. The setting file transmission tool 2001 performs the following processing described in the flow chart in FIG. 12.

In step S1201, the setting file transmission tool 2001 performs processing for acquiring a path to the setting file. In this processing, the setting file transmission tool 2001 acquires a path to the setting file set by the user via the setting file selection screen (FIG. 11).

In step S1202, the setting file transmission tool 2001 performs processing for checking the file path. More specifically, the setting file transmission tool 2001, using the transmission target application management function 5005, determines whether the setting file path acquired in step S1201 has been set. If it is determined in step S1202 that the setting file path acquired in step S1201 has not been set (PATH NOT SET in step S1202), then the setting file transmission tool 2001 advances to step S1210. In step S1210, the setting file transmission tool 2001 displays an error dialog (error message).

In this regard, in terms of security, the user may desire to change the path to (location of) the setting file for the application installed on the MFP. Accordingly, in the present exemplary embodiment, the location of the setting file (path to the setting file) can be changed.

In step S1203, the setting file transmission tool 2001 performs processing for determining whether the setting file exists. More specifically, the setting file transmission tool 2001, using the transmission target application management function 5005, determines whether the setting file exists in the path acquired in step S1201. If it is determined in step S1203 that the setting file does not exist in the path acquired in step S1201 (DOES NOT EXIST in step S1203), then the setting file transmission tool 2001 advances to step S1210. In step S1210, the setting file transmission tool 2001 displays an error dialog.

In step S1204, the setting file transmission tool 2001 determines whether the setting file is empty. More specifically, the setting file transmission tool 2001 checks the content of the file, which has been determined to exist in step S1203, using the transmission target application management function 5005. If it is determined in step S1204 that the setting file is empty (0 BYTE in step S1204), then the setting file transmission tool 2001 advances to step S1210. In step S1210, the setting file transmission tool 2001 displays an error dialog.

In step S1205, the setting file transmission tool 2001 performs processing for determining whether the application version of the selected application is a higher-order version. More specifically, the setting file transmission tool 2001 determines the version of the selected application matches any application version described in the transmission target application file.

If it is determined in step S1205 that the version of the selected application does not match any application version described in the transmission target application file (HIGHER-ORDER APPLICATION in step S1205), then the setting file transmission tool 2001 advances to step S1206. On the other hand, if it is determined in step S1205 that the version of the selected application matches an application version described in the transmission target application file, then the setting file transmission tool 2001 acquires the setting information (transmission target application file information) from the transmission target application file.

In step S1206, the setting file transmission tool 2001 sets the latest version application as a check reference version application. The setting file transmission tool 2001, using the transmission target application management function 5005, compares the version of the selected application with the version information described in the transmission target application file, to acquire the setting information (transmission target application file information), based on which the setting file transmission tool 2001 performs the transmission processing.

If it is determined in step S1206 that the version of the selected application is later than the latest version of the application described in the transmission target application file, the latest version is set for the setting information. More specifically, if versions 2.0, 2.1, and 3.0 exist as versions of the transmission target file and if the version of the selected application is 4.0, then the setting file transmission tool 2001 acquires the setting information for version 3.0.

If it is determined in step S1206 that the version of the selected application is later than an earliest version and earlier the latest version of the application described in the transmission target application file, the setting file transmission tool 2001 acquires the setting information for a version immediately earlier than the version of the selected application. More specifically, if versions 2.0, 2.1, and 3.0 exist as versions of the transmission target file and if the version of the selected application is 2.3, then the setting file transmission tool 2001 acquires the setting information for version 2.1.

In step S1207, the setting file transmission tool 2001 performs processing for acquiring the setting information. In this processing, the setting file transmission tool 2001 acquires the setting information determined in steps S1205 and S1206.

In step S1208, the setting file transmission tool 2001 checks the file for error. In this processing, the setting file transmission tool 2001, using the transmission target application management function 5005, checks the content of the file acquired in step S1201 based on the setting information acquired in step S1207. If it is determined in step S1207 that the file is defective (a case where the file includes no key or other errors) (ERROR FOUND in step S1208), then the setting file transmission tool 2001 advances to step S1210. In step S1210, the setting file transmission tool 2001 displays an error dialog.

In step S1209, the setting file transmission tool 2001 performs processing for displaying the transmission destination device selection screen. In this processing, the setting file transmission tool 2001, using the transmission target application management function 5005, reads the device list file and displays a list of devices installed with the selected application, based on the information acquired by reading the device list file. When the user selects a group name, the setting file transmission tool 2001, using the transmission target application management function 5005, reads the group list file and filters the list of devices to be displayed, based on the information acquired by reading the group list file.

Figure 13:
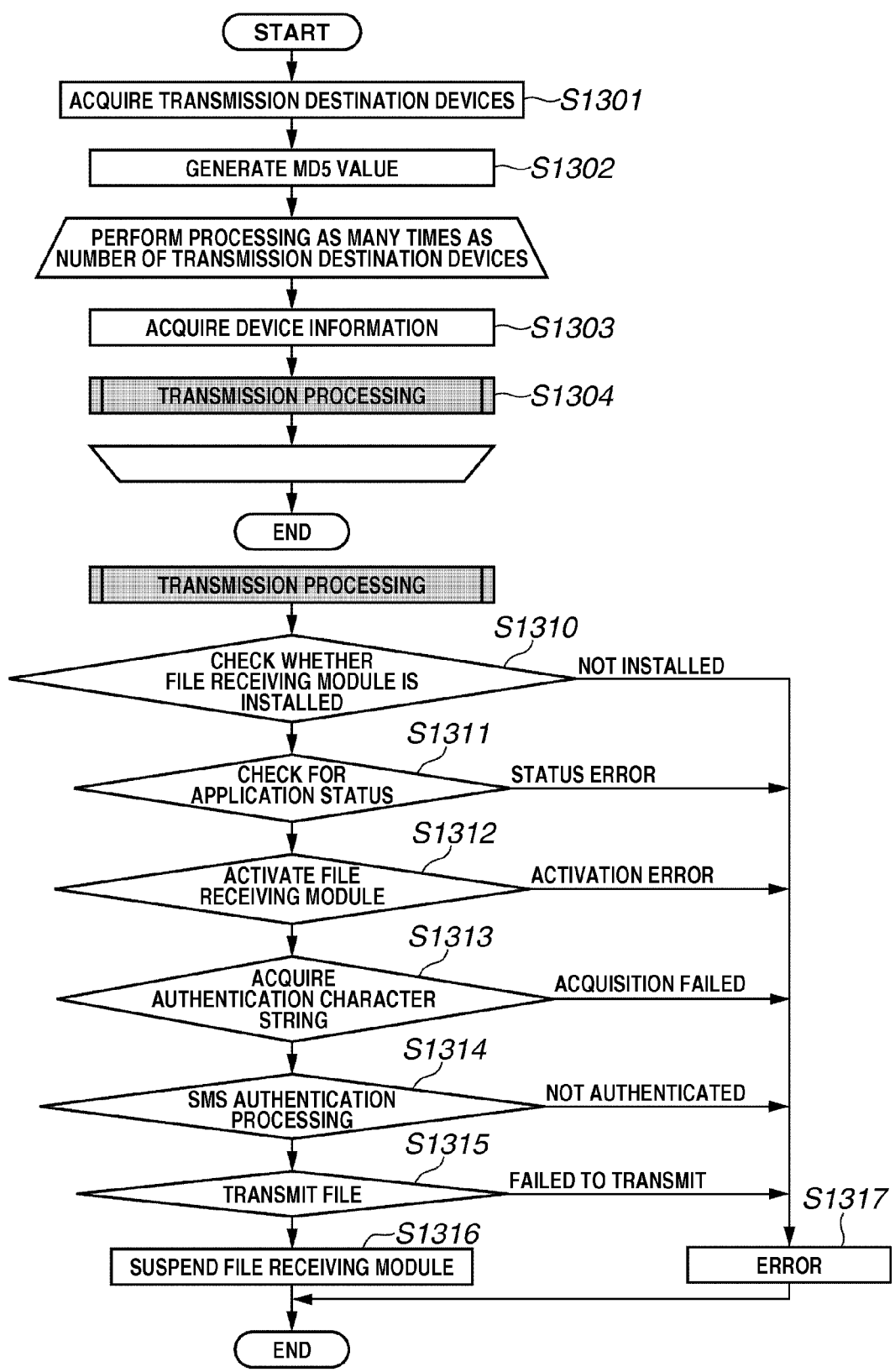
FIG. 13 is a flow chart illustrating an example of processing performed by a PC for transmitting the setting file according to an exemplary embodiment of the present invention.

FIG. 13 is a flow chart illustrating an example of processing performed by the information processing apparatus for transmitting the setting file according to an exemplary embodiment.

Referring to FIG. 13, in step S1301, the setting file transmission tool 2001 performs processing for acquiring a transmission destination device. In this processing, the setting file transmission tool 2001, using the transmission target application management function 5005, acquires a list of transmission destination device selected by the user via the setting file selection screen.

In step S1302, the setting file transmission tool 2001 performs processing for generating a Message-Digest algorithm 5 (MD5) value. In this processing, the setting file transmission tool 2001, using the transmission target application management function 5005, generates an MD5 value for the setting file selected by the user via the setting file selection screen.

In step S1303, the setting file transmission tool 2001 acquires device information.

In step S1304, the setting file transmission tool 2001, using the transmission target application management function 5005, calls the setting file transmission function 5006 to transmit the setting file to the transmission destination device.

In step S1310, the setting file transmission tool 2001 performs processing for checking for a file receiving module 2007 for its presence. In this processing, the setting file transmission tool 2001, using the transmission target application management function 5005, checks whether the file receiving module 2007 is installed on the transmission destination device. If it is determined in step S1310 that no file receiving module 2007 is installed on the transmission destination device, then the setting file transmission tool 2001 advances to step S1317. In step S1317, the setting file transmission tool 2001 displays an error dialog.

In step S1311, the setting file transmission tool 2001 performs processing for checking for a status of the transmission destination application. In this processing, the setting file transmission tool 2001, using the transmission target application management function 5005, checks for a status of the transmission destination application.

Whether the setting file can be transmitted is determined based on a value for a "transmission type" in the transmission target application file. More specifically, if the value for the transmission type is set at "0", in the case other than cases where the application has been suspended or installed, then the setting file transmission tool 2001 advances to step S1317 to display an error dialog. On the other hand, if the value for the transmission type is set at "1", in the case other than cases where the application has been already activated or suspended after its restart, then the setting file transmission tool 2001 advances to step S1317 to display an error dialog.

In step S1312, the setting file transmission tool 2001 performs processing for activating the file receiving module 2007. In this processing, the setting file transmission tool 2001, using the transmission target application management function 5005, activates the file receiving module 2007 installed on the transmission destination device, to start the transmission of the setting file. If the file receiving module 2007 is not successfully activated, then the setting file transmission tool 2001 determines that an activation error has occurred and advances to step S1317. In step S1317, the setting file transmission tool 2001 displays an error dialog. On the other hand, if it is determined in step S1312 that the file receiving module 2007 has been successfully activated, then the setting file transmission tool 2001 advances to step S1313.

In step S1313, the setting file transmission tool 2001 performs processing for acquiring an authentication character string. In this processing, the setting file transmission tool 2001 performs an SMS user authentication for the transmission destination device, before transmitting the setting file thereto. The setting file transmission tool 2001 acquires an authentication character string required in performing the authentication.

In step S1314, the setting file transmission tool 2001 performs SMS user authentication processing. In this processing, the setting file transmission tool 2001, using the transmission target application management function 5005, performs processing for authenticating the user for the transmission destination device based on the authentication character string acquired in step S1313 and an SMS password entered by the user. If the user is not successfully authenticated, then the setting file transmission tool 2001 determines that an authentication error has occurred and advances to step S1317. In step S1317, the setting file transmission tool 2001 displays an error dialog.

In step S1315, the setting file transmission tool 2001 transmits the selected setting file. In this processing, the setting file transmission tool 2001, using the transmission target application management function 5005, transmits the setting file to the file receiving module 2007 of the transmission destination device.

In this processing, the setting file transmission tool 2001 sends information, such as the application ID, the file name (file path), the MD5 value, and an encryption flag, in addition to the selected setting file to the file receiving module 2007 of the transmission destination device.

Here, the file receiving module 2007 of the transmission destination device receives the above information and the setting file, and then transmits the received setting file to the transmission destination application based on the received information. Then, the file receiving module 2007 sends a result of the transmission (information about whether the transmission has been successfully completed) to the setting file transmission tool 2001.

In step S1316, the setting file transmission tool 2001 suspends the file receiving module 2007.

Figure 14:
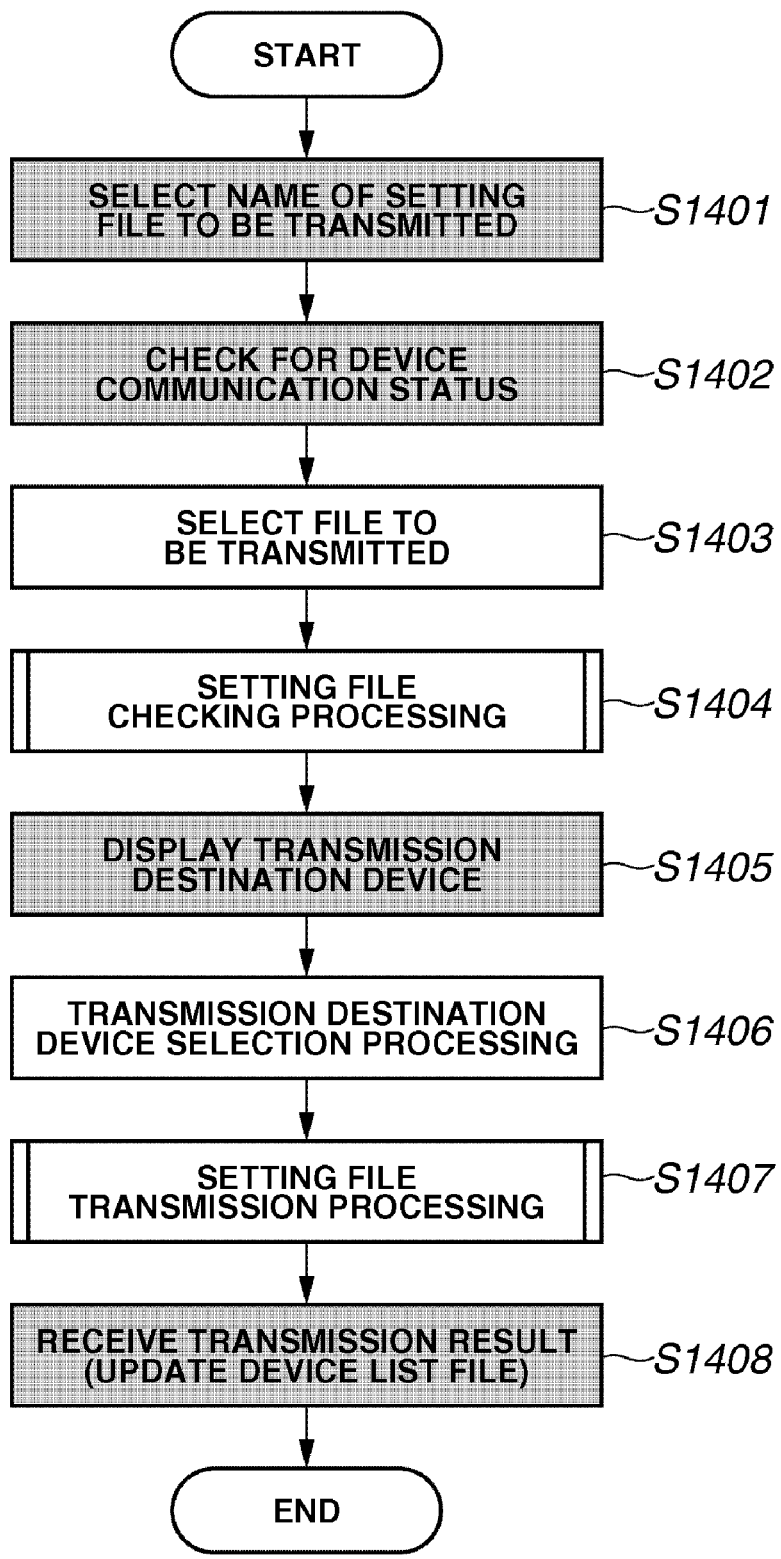
FIG. 14 is a flow chart illustrating an example of processing performed by a PC for retransmitting the setting file according to an exemplary embodiment of the present invention.

FIG. 14 is a flow chart illustrating an example of processing performed by the information processing apparatus for retransmitting the setting file according to an exemplary embodiment.

If a value "NG" is indicated in the "list of transmission results" field displayed when the user selects the "setting item list" tab 7003, then the user can click the "retransmit" button displayed on the current screen. On the other hand, if a value "NG" is not indicated in the "list of transmission results" field, the "retransmit" button is displayed in a grayed-out state. In this case, the user cannot click the "retransmit" button.

Referring to FIG. 14, in step S1401, the user selects the name of the setting file to be transmitted. In this processing, the user can click the "setting item list" tab 7003 (FIG. 9) and then select the name of the setting file to be transmitted. Then, the user selects the "retransmit" button.

Figure 15:
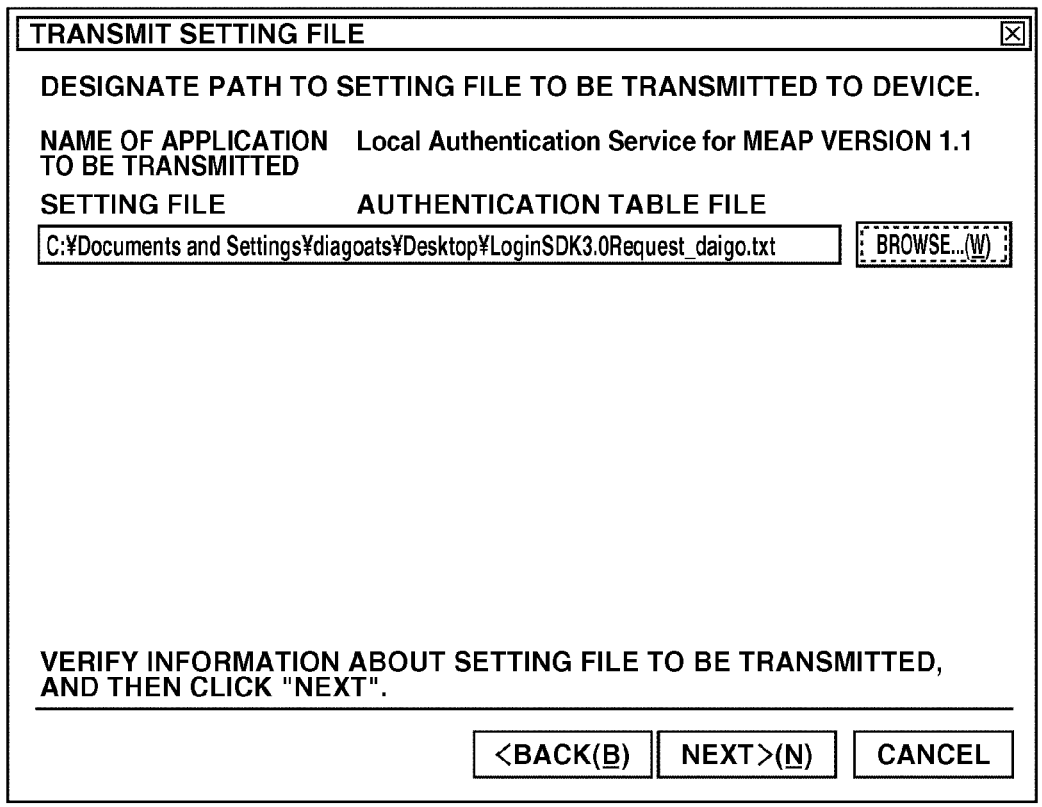
FIG. 15 illustrates an example of a display screen provided by the setting file transmission tool and displayed on a PC according to an exemplary embodiment of the present invention.

The following information and file are set to be displayed on the setting file selection screen (FIG. 15), which is displayed when the user selects the "retransmit" button. That is, the setting file selection screen displays the name of the selected application, the version of the selected application, the selected file to be transmitted, and the information about the device for which the value "NG" is described in the displayed list of transmission results.

In step S1402, the setting file transmission tool 2001 checks the status of communication with the transmission destination device. When the user selects the "retransmit" button, the setting file transmission tool 2001, using the transmission target application management function 5005, checks for the communication status with respect to the NG device (the device for which the value "NG" is described in the displayed list of transmission results), to which the setting file is to be transmitted. If the communication with the retransmission destination device is not available, the setting file transmission tool 2001 displays an error dialog.

In step S1403, the user selects the file to be transmitted. More specifically, in this processing, the user selects the setting file to be transmitted, from among the setting files stored in the MFP 1003, on which the setting file transmission tool 2001 is installed, via the setting file selection screen.

At this time, the setting file transmission tool 2001 displays a previously acquired "previously-transmitted file path", which is stored in the transmission history file, in a default state. After selecting the setting file to be transmitted, the user selects the "next" button.

In step S1404, the setting file transmission tool 2001 performs processing for checking the setting file. More specifically, in this processing, the setting file transmission tool 2001, using the transmission target application management function 5005, compares the content of the selected setting file with the information described in the setting file, which is described in the transmission target application file to determine if the setting files match each other. Here, if the setting file has been encrypted, the setting file transmission tool 2001 decrypts the encrypted setting file before checking its content. If the setting files do not match each other, then the setting file transmission tool 2001 displays an error dialog. In this case, the setting file transmission tool 2001 does not transmit the selected setting file.

In the case where the selected application version is later than the version stored in the transmission target application list, in comparing the contents of the setting files, the setting file transmission tool 2001 uses information about the application included in the transmission target application list whose version is closest to the selected application version for the comparison. Thus, the setting file transmission tool 2001 is not required to frequently update the list at every updating of an application.

In step S1405, the setting file transmission tool 2001 displays the transmission destination device. After the user has selected the setting file to be transmitted, the setting file transmission tool 2001, using the transmission target application management function 5005, reads the device list file and displays the list of devices installed with the selected application, based on the information acquired by reading the device list file. Here, the device whose communication with the information processing apparatus has been determined available in step S1402 is already set as a transmission destination device and can be excluded from the transmission destination device list.

In step S1406, the user selects the transmission destination device. In this processing, the user verifies the device list displayed in step S1405 (all of the devices in the device list are set as a transmission destination device in a default state), and then selects the "next" button.

In step S1407, the setting file transmission tool 2001 transmits the selected setting file.

In step S1408, the setting file transmission tool 2001 receives a result of the transmission from the file receiving module 2007. The setting file transmission tool 2001 updates the transmission history file based on the received transmission result. Here, the setting file transmission tool 2001 overwrites only the information about the device to which the setting file has been retransmitted, with the information described in the received transmission result. Then, the setting file transmission tool 2001 updates the device list file based on the received information described in the transmission result.

The following setting information can be easily set by the user in the case of the above-described application program for performing a user authentication with an integrated circuit (IC) card.

Authentication server setting information includes information such as a computer name and address of an authentication server that makes an inquiry about whether a login name and a password read from the IC card are appropriate. Here, an "authentication server timeout" refers to a wait time until an error is detected based on a timeout occurring when no reply is sent from the authentication server.

As the setting information, the administrator of the system can perform a setting for authentication server setting information, an authentication server timeout, and the following information.

"Card reading position information" describes information about a position of the IC card at which the information required for user authentication is read by the above-described IC card authentication application program installed on the MFP. A "polling time" refers to information about a time interval for issuing a request for reading the IC card with an IC card reader. A "user code start" refers to an address at which the reading of the user ID starts. Another address is provided with respect to the password.

A "user code length" refers to information about the length of the character string of the user ID. Another length is provided with respect to the password. The above information is a mere example and a larger volume of setting information is required in an actual operation of the system.

The present invention is not limited to the above-described exemplary embodiment. That is, the present invention can be implemented as a system, an apparatus, a program, or a storage medium. More specifically, the present invention can be applied to a system including a plurality of devices and to an apparatus that includes one device.

Furthermore, to achieve a higher security level, the application program installed on the MFP can be installed on each of the MFPs 1001 through 1003 in a mutually-different directory path. However, in this case, since it is necessary for the administrator of the system to know in which directory path the transmission target application program is installed, with respect to each of the MFPs 1001 through 1003, it may be inappropriate to send the setting files at once to the plurality of MFPs (the MFPs 1001 through 1003).

In order to address this, the present invention can provide a method for saving an administrator of the system from taking the trouble of searching for an MFP installed with the application program to which the setting file is to be transmitted, and a method for transmitting the setting file for the application program to an appropriate MFP with a simple operation.

Second Exemplary Embodiment

A second exemplary embodiment of the present invention will be described below. In the first exemplary embodiment, it is assumed that the MFP, to which the setting file is to be transmitted, is previously equipped with the file receiving module 2007 before the setting file transmission tool 2001 sends the setting file for the application thereto. However, the present invention can transmit the file receiving module 2007 itself to an MFP that does not previously include the file receiving module 2007.

A modification for transmitting a setting file and the file receiving module 2007 will be described in detail below with reference to a flow chart illustrated in FIG. 16.

Figure 16:
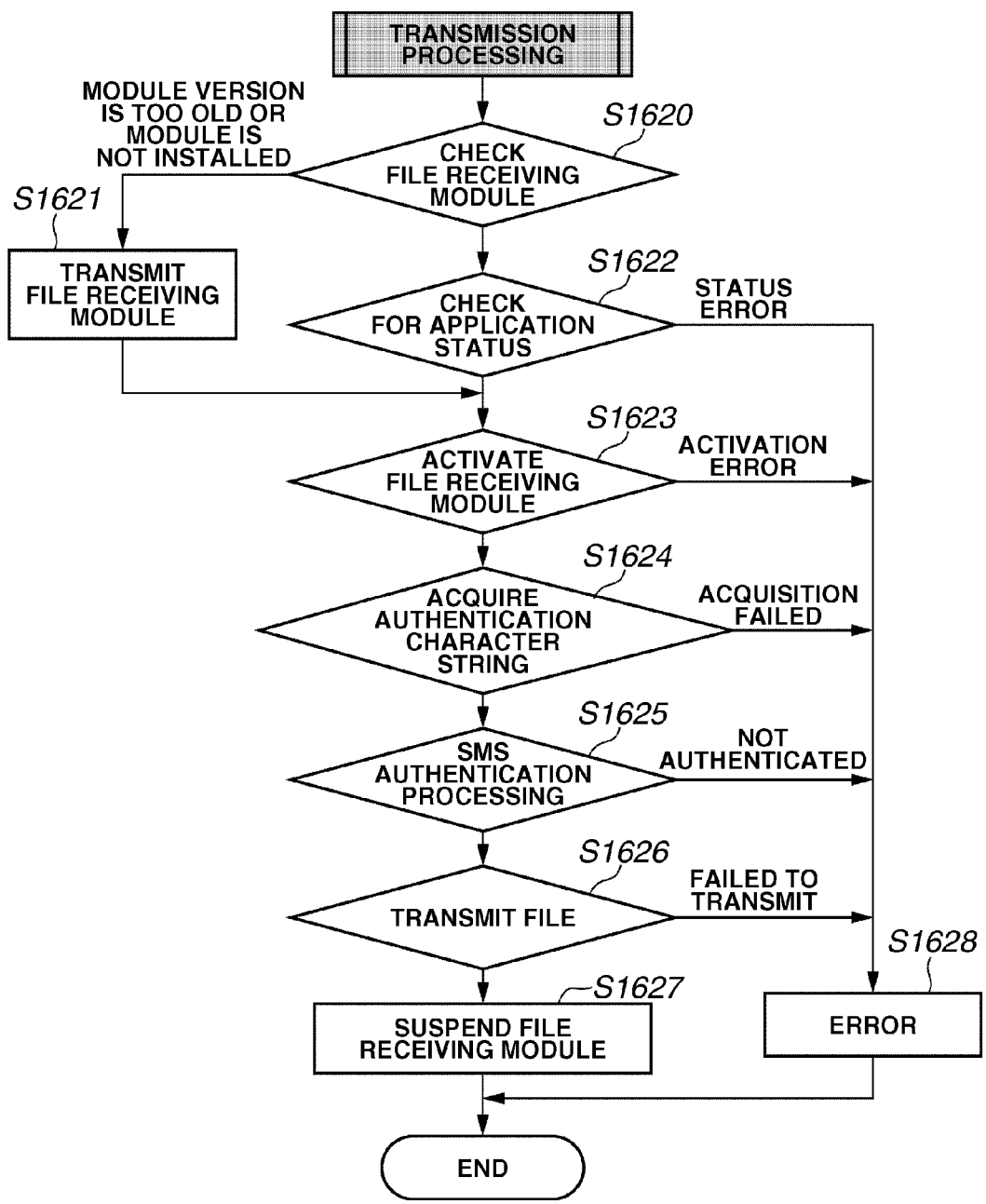
FIG. 16 is a flow chart illustrating an example of processing performed by the PC for transmitting the setting file according to an exemplary embodiment of the present invention.

Referring to FIG. 16, in step S1620, the setting file transmission tool 2001 determines whether the transmission destination MFP previously includes the file receiving module 2007. More specifically, in this processing, the setting file transmission tool 2001, using the transmission target application management function 5005, determines whether the file receiving module 2007 has been already installed on the transmission destination MFP. If it is determined that the file receiving module 2007 has been already installed on the transmission destination MFP, then the setting file transmission tool 2001 further checks the version of the installed file receiving module 2007.

If it is determined in step S1620 that no file receiving module 2007 has been installed on the transmission destination MFP or if the version of the installed file receiving module 2007 is old, then the setting file transmission tool 2001 advances to step S1621. On the other hand, if it is determined in step S1620 that the file receiving module 2007 of an appropriate version has been installed on the transmission destination MFP, then the setting file transmission tool 2001 advances to step S1622.

In step S1621, the setting file transmission tool 2001 transmits the file receiving module 2007 to the transmission destination MFP.

In step S1622, the setting file transmission tool 2001 performs processing for checking for a status of the transmission destination application. In this processing, the setting file transmission tool 2001, using the transmission target application management function 5005, checks for a status of the transmission destination application.

Whether the setting file can be transmitted is determined based on a value for a "transmission type" in the transmission target application file. More specifically, if the value for the transmission type is set at "0", in the case other than cases where the application has been suspended or installed, then the setting file transmission tool 2001 determines that an error has occurred. In this case, the setting file transmission tool 2001 advances to step S1628 to display an error dialog. On the other hand, if the value for the transmission type is set at "1", in the case other than cases where the application has been already activated or suspended after its restart, then the setting file transmission tool 2001 determines that an error has occurred. In this case, the setting file transmission tool 2001 advances to step S1628 to display an error dialog. If it is determined in step S1622 that no error has occurred, then the setting file transmission tool 2001 advances to step S1623.

In step S1623, the setting file transmission tool 2001 performs processing for activating the file receiving module 2007. In this processing, the setting file transmission tool 2001, using the transmission target application management function 5005, activates the file receiving module 2007 installed on the transmission destination device, to start the transmission of the setting file. If the file receiving module 2007 is not successfully activated, then the setting file transmission tool 2001 determines that an activation error has occurred and advances to step S1628. In step S1628, the setting file transmission tool 2001 displays an error dialog. On the other hand, if it is determined in step S1623 that the file receiving module 2007 has been successfully activated, then the setting file transmission tool 2001 advances to step S1624.

In step S1624, the setting file transmission tool 2001 performs processing for acquiring an authentication character string. In this processing, the setting file transmission tool 2001 performs an SMS user authentication for the transmission destination device, which is required for performing the transmission. The setting file transmission tool 2001 acquires an authentication character string required in performing the authentication. If the authentication character string has not been successfully acquired, then the setting file transmission tool 2001 advances to step S1628. In step S1628, the setting file transmission tool 2001 displays an error dialog. On the other hand, if the authentication character string has been successfully acquired, then the setting file transmission tool 2001 advances to step S1625.

In step S1625, the setting file transmission tool 2001 performs SMS user authentication processing. In this processing, the setting file transmission tool 2001, using the transmission target application management function 5005, performs processing for authenticating the user for the transmission destination device based on the authentication character string acquired in step S1624 and an SMS password entered by the user. If the user is not successfully authenticated, then the setting file transmission tool 2001 determines that an authentication error has occurred and advances to step S1628. In step S1628, the setting file transmission tool 2001 displays an error dialog. On the other hand, if the user is successfully authenticated, then the setting file transmission tool 2001 advances to step S1626.

In step S1626, the setting file transmission tool 2001 transmits the selected setting file. In this processing, the setting file transmission tool 2001, using the transmission target application management function 5005, transmits the setting file to the file receiving module 2007 of the transmission destination device.

In this processing, the setting file transmission tool 2001 sends information such as the application ID, the file name (file path), the MD5 value, and an encryption flag, in addition to the selected setting file, to the file receiving module 2007 of the transmission destination device.

Here, the file receiving module 2007 of the transmission destination device receives the above information and the setting file, and then transmits the received setting file to the transmission destination application based on the received information. Then, the file receiving module 2007 sends a result of the transmission (information about whether the transmission has been successfully completed) to the setting file transmission tool 2001.

In step S1627, the setting file transmission tool 2001 suspends the file receiving module 2007.

Figure 20:
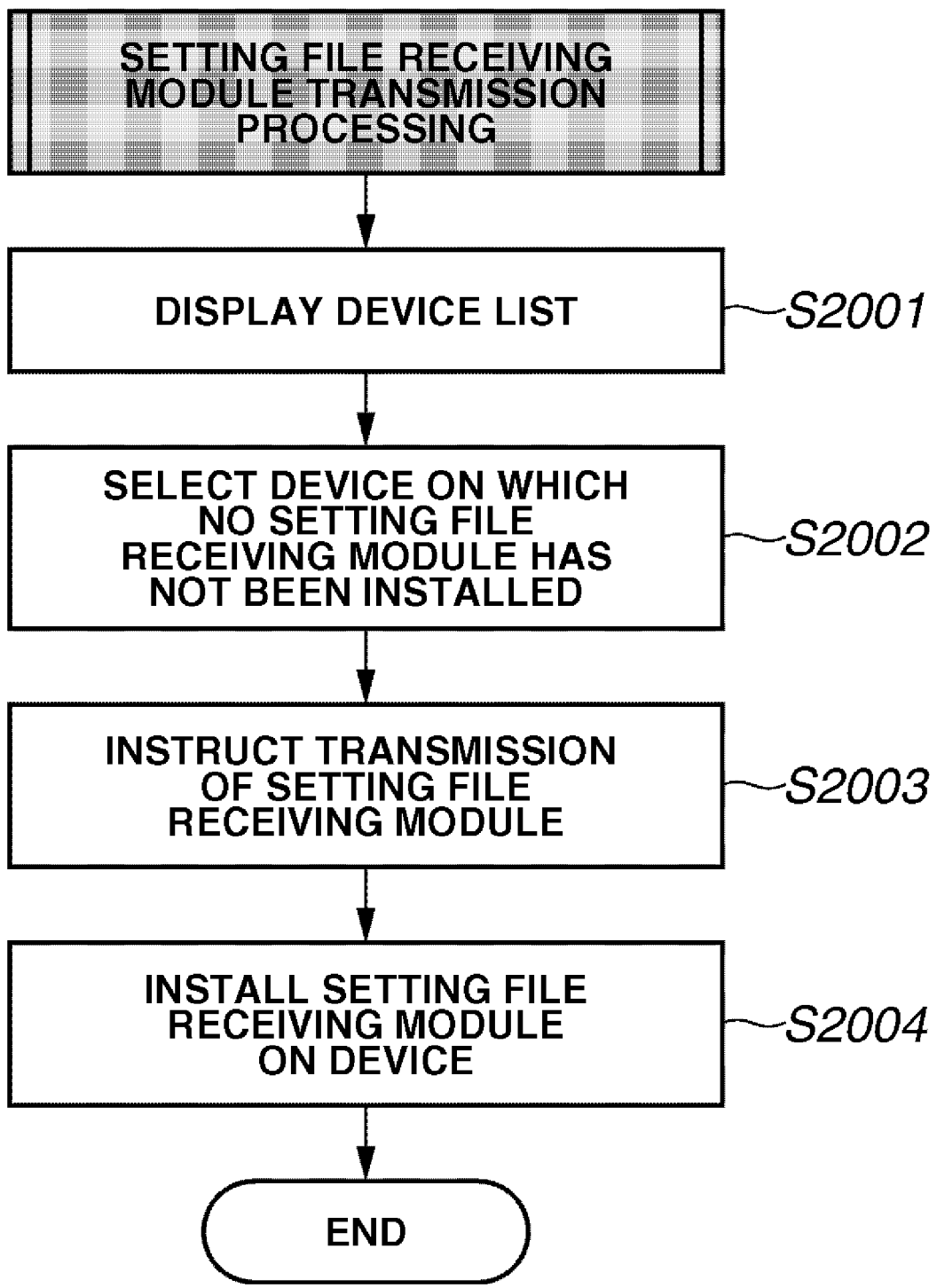
FIG. 20 is a flow chart illustrating a modification of the processing for transmitting a setting file performed by a PC according to an exemplary embodiment of the present invention.

Now, a modification of the above-described exemplary embodiment for installing the file receiving module 2007 (the processing performed in step S6003 in FIG. 6) will be described in detail below. FIG. 20 is a flow chart illustrating an example of processing for transmitting the file receiving module 2007.

Each of FIGS. 17, 18, 19, and 21 illustrates an example of a display screen provided by the setting file transmission tool 2001, which is displayed on the PC 1004. The setting file transmission tool 2001 performs the processing in the following manner.

Figure 17:
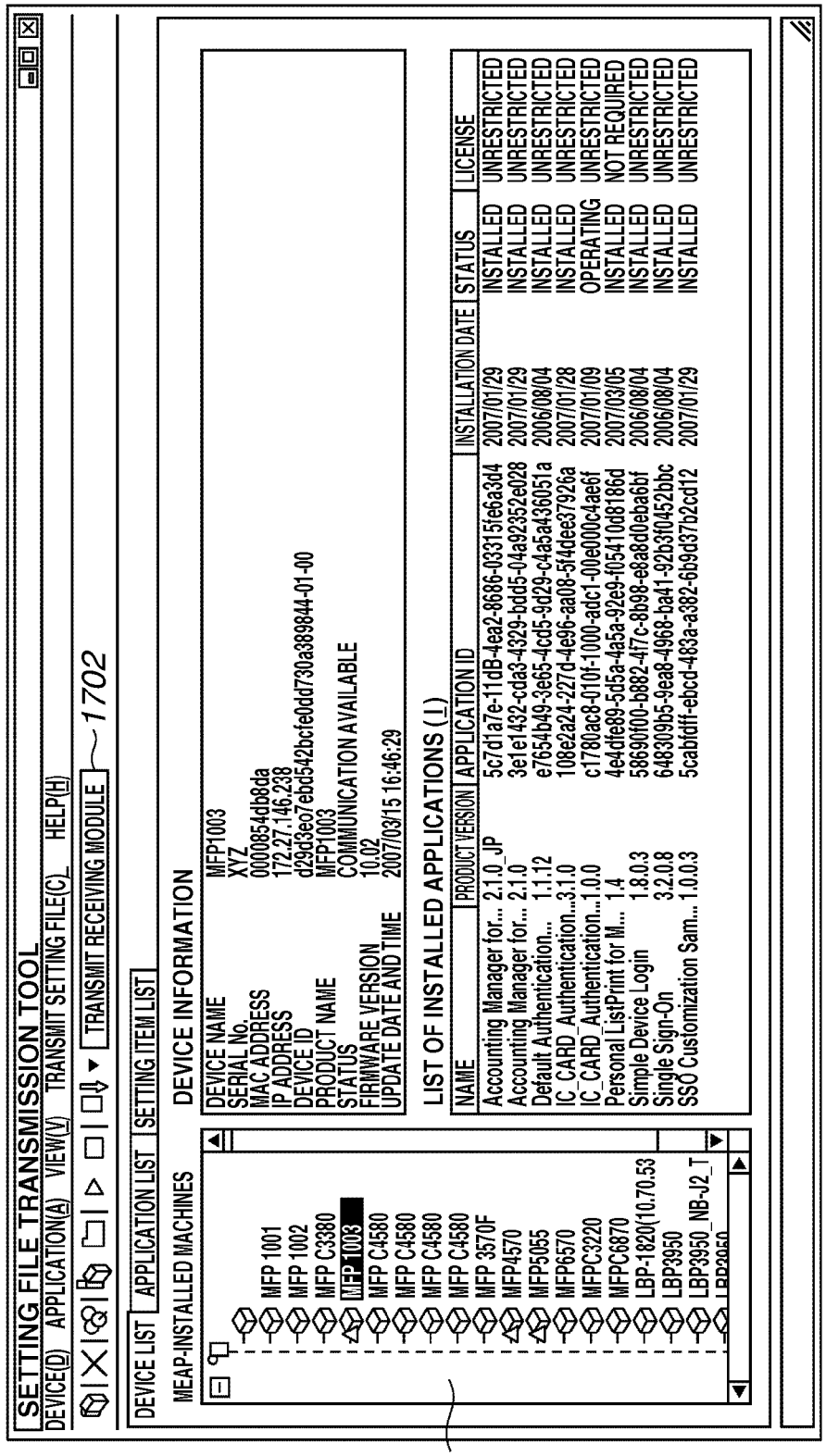
FIG. 17 illustrates an example of a display screen provided by the setting file transmission tool and displayed on a PC according to an exemplary embodiment of the present invention.
Figure 18:
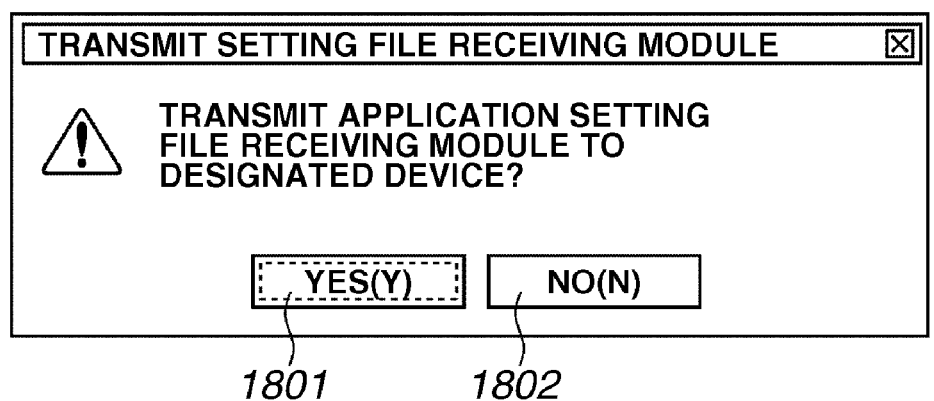
FIG. 18 illustrates an example of a display screen provided by the setting file transmission tool and displayed on a PC according to an exemplary embodiment of the present invention.

Referring to FIG. 20, in step S2001, the setting file transmission tool 2001 displays a list of devices detected as a result of the search for devices. In the device list, a device that is not installed with the file receiving module 2007 is displayed with an icon for the device (MFP) as illustrated in FIG. 17, to indicate that the MFP corresponding to such an icon is not installed with the file receiving module 2007.

In step S2002, the setting file transmission tool 2001 detects that the user has selected a device that is not installed with the file receiving module 2007. Here, the user selects the device from among those in the device list. As illustrated in an "MEAP-installed machines" filed 1701 in FIG. 17, a triangular mark is provided with respect to the device that is not installed with the file receiving module 2007.

In step S2003, the user issues an instruction for transmitting the file receiving module 2007. In this processing, the user presses a "transmit receiving module" button 1702 (FIG. 17) to instruct the transmission of the file receiving module 2007.

In this case, the setting file transmission tool 2001 displays a dialog (FIG. 18) to allow the user to verify whether to start the processing. If the user presses a "YES" button 1801 (FIG. 18), then the setting file transmission tool 2001 continues the processing. On the other hand, if the user presses a "NO" button 1802 (FIG. 18), then the setting file transmission tool 2001 ends the processing.

In step S2004, the setting file transmission tool 2001 transmits the file receiving module 2007 to the selected transmission destination device to be installed thereon.

Figure 19:
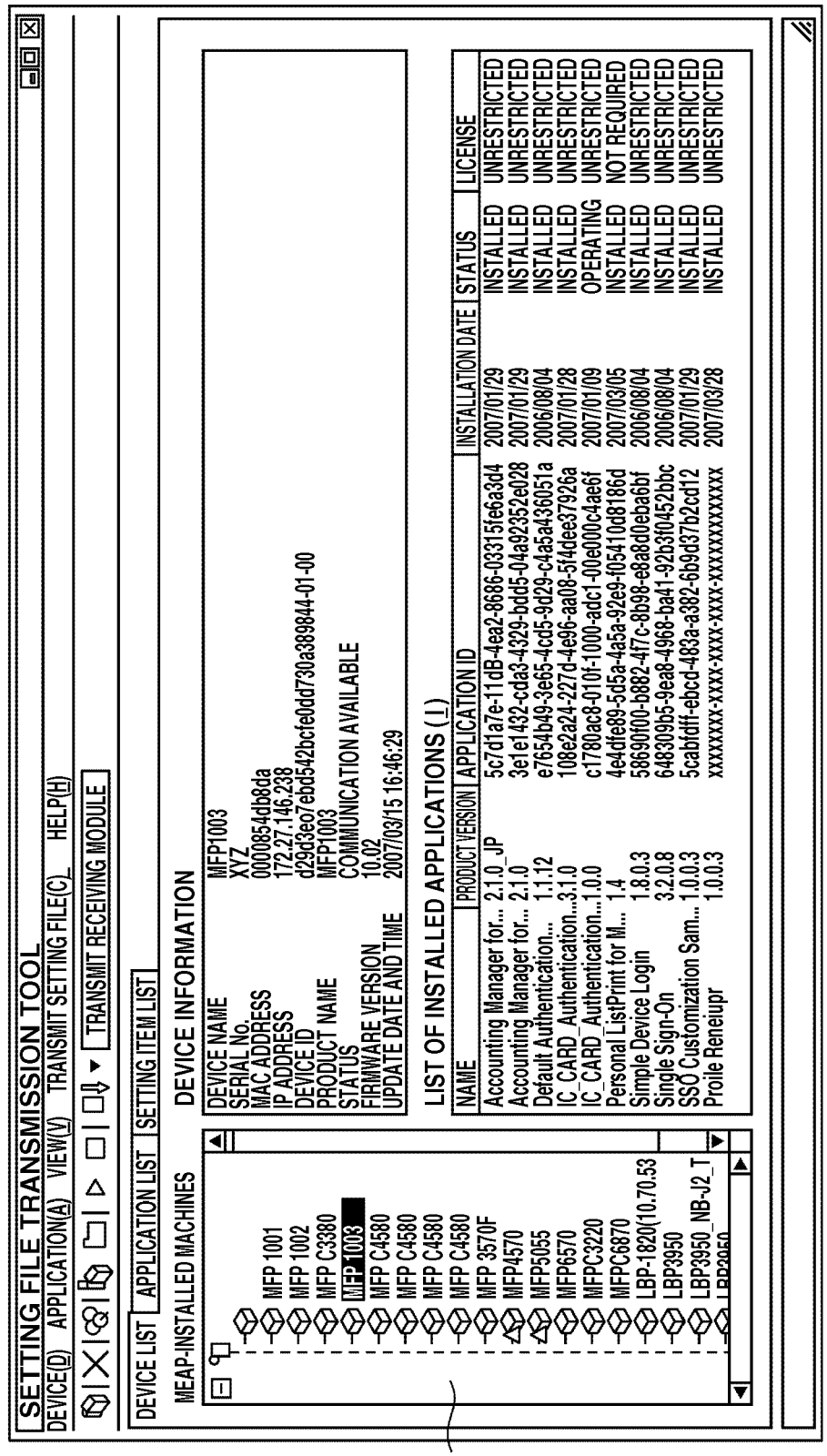
FIG. 19 illustrates an example of a display screen provided by the setting file transmission tool and displayed on a PC according to an exemplary embodiment of the present invention.

If the file receiving module 2007 has been successfully installed as a result of the installation processing in step S2004, then the setting file transmission tool 2001 updates the device list and an "MEAP-installed machines" field 1901 for the selected transmission destination device, as illustrated in FIG. 19, to allow the user to verify that the file receiving module 2007 is successfully installed on the selected transmission destination device. After this processing, the setting file transmission tool 2001 continues the processing in step S6004 and subsequent steps (FIG. 6).

Figure 22:
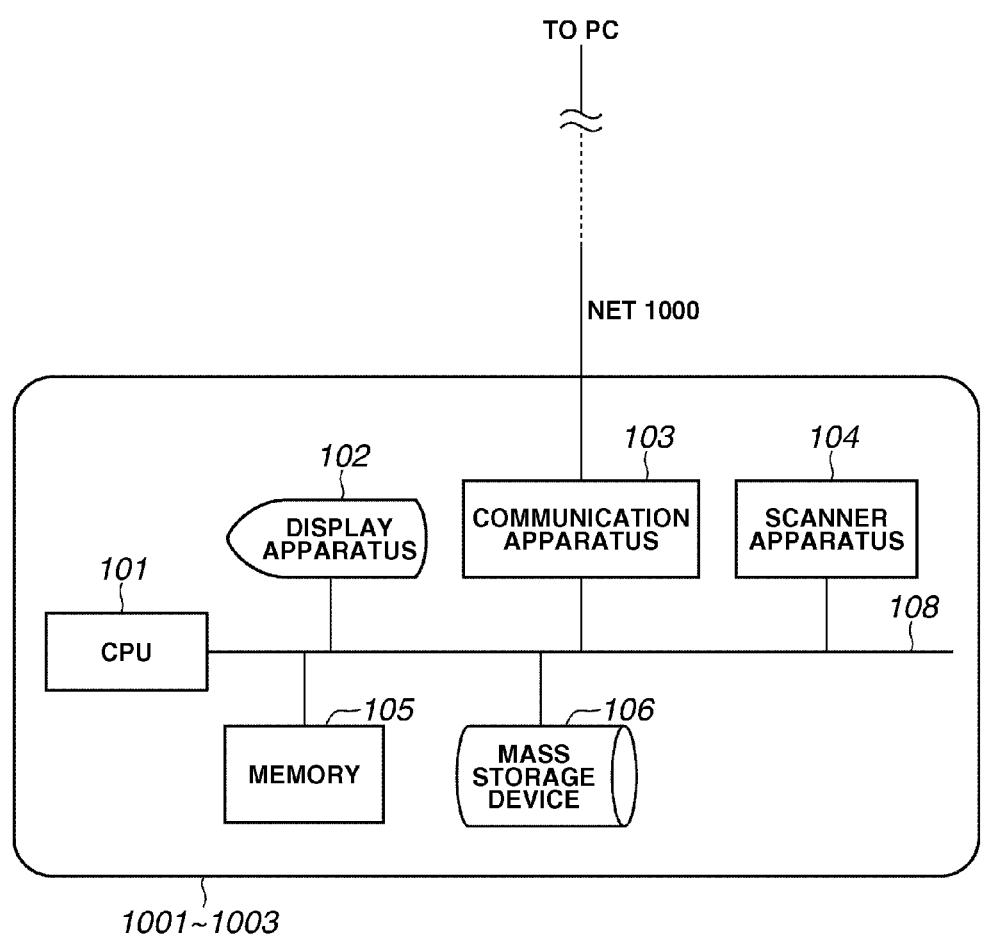
FIG. 22 illustrates an example of a hardware configuration of an MFP according to an exemplary embodiment of the present invention.

FIG. 22 illustrates an example of a hardware configuration of the PC 1004 according to an exemplary embodiment.

Referring to FIG. 22, a CPU 101 is in communication with each unit and apparatus via an internal bus 108. The CPU 101 controls the MFP 1001, MFP 1002, and MFP 1003. The CPU 101 loads programs shown in FIG. 2 into a memory 105.

A display apparatus 102 displays a user interface on a touch panel (operation panel) provided thereon. A user can issue an instruction for performing desired processing via a user interface displayed on the display apparatus 102.

A communication apparatus 103 sends and receives information to perform data communication with the PC 1004 via the NET 1000. A scanner apparatus 104 reads a paper document.

The CPU 101 loads information and data (program) from a memory 106, which is a mass-storage device that can temporarily store various programs stored on the MFPs 1001 through 1003, on a random access memory (RAM) (not illustrated) and executes the loaded program.

Figure 23:
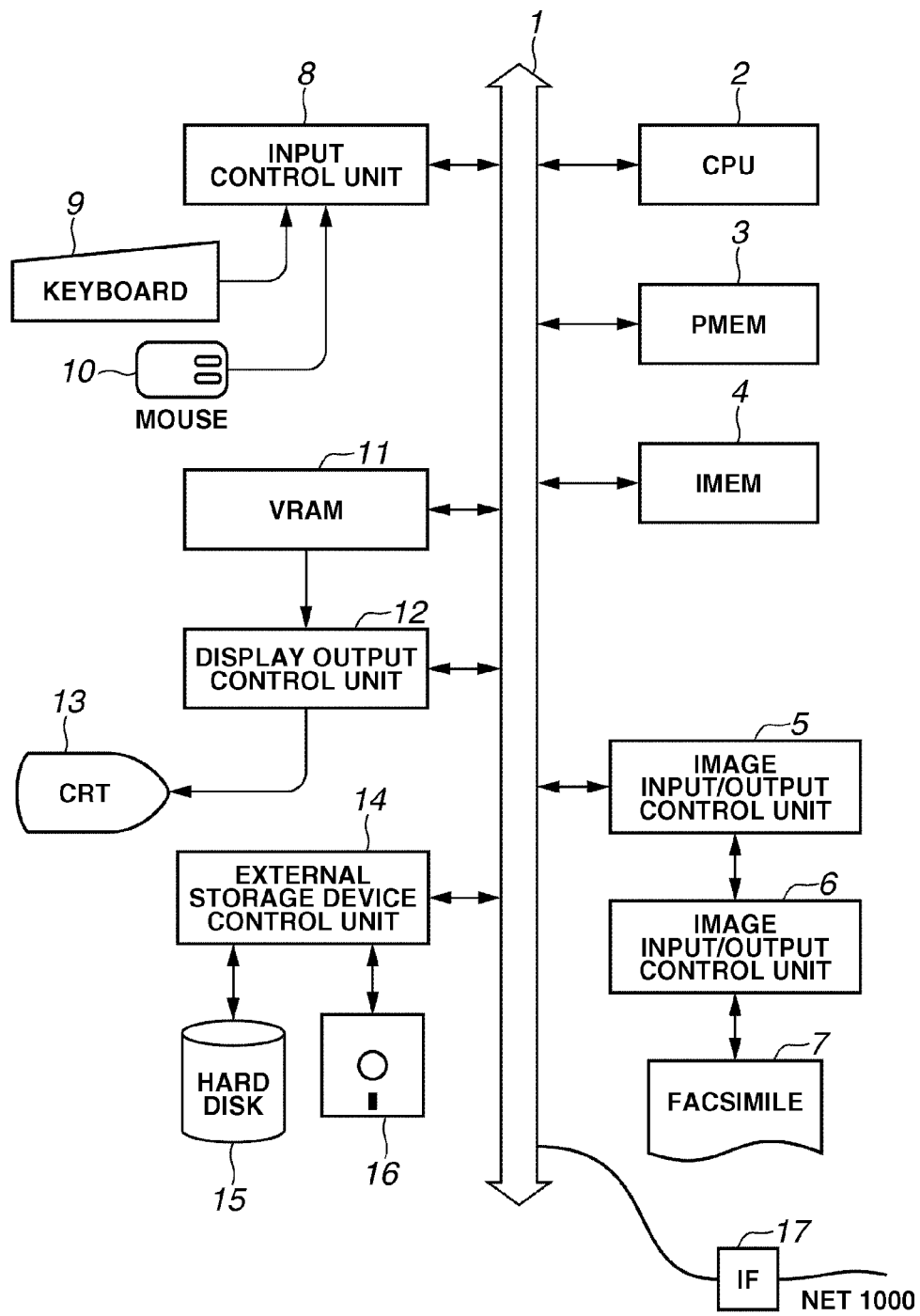
FIG. 23 illustrates an example of a hardware configuration of a PC according to an exemplary embodiment of the present invention.

FIG. 23 illustrates an example of a hardware configuration of the PC 1004 according to an exemplary embodiment.

Referring to FIG. 23, each component of the PC 1004 is mutually connected via a system bus 1. The software block of the PC 1004 (FIG. 4) is stored on a hard disk 15. The program is read and executed with a CPU 2 when necessary.

The CPU 2 performs processing according to a control program stored on a program memory (PMEM) 3, the hard disk 15, or a floppy disk (FD) 16.

The CPU 2 selects and loads a program for transmitting a setting file, as necessary, from the hard disk 15 onto the PMEM 3. Then, the CPU 2 executes the program on the PMEM 3. Data input via a keyboard 9 is stored on the PMEM 3, which is also a text memory, as code information.

An image memory (IMEM) 4 temporarily stores image data. An image input/output control unit 5 performs control of input and output of image data and user setting information sent to and received from a facsimile machine 7.

The PC 1004, via a network interface (I/F) 17 (receiving unit) that connects the PC 1004 to the NET 1000, sends and receives information and data, such as a setting file, with the MFPs 1001 through 1003. The facsimile machine 7 is connected to an image input/output control unit 6, which is connected to the image input/output control unit 5.

User setting information read by the facsimile machine 7 is temporarily stored on the PMEM 3. Then, the user setting information is converted into data of a format adapted to be displayed on a screen of the PC 1004 and loaded on a video random access memory (VRAM) 11. Then, the user setting information is displayed on a cathode ray tube (CRT) 13. Data of document to be sent is rasterized on the IMEM 4 as bitmap data. Then, the image input/output control unit 5 performs control for outputting the bitmap data to the image input/output unit 6 connected to the facsimile 7 together with function designation information.

Input devices, such as the keyboard 9 and a pointing device (PD) 10, are connected to an input control unit 8. The operator (administrator or user) of the PC 1004 operates the keyboard 9 to issue an operation command for the system.

The PD 10 includes a mouse, via which the user can select, process, instruct image information, graphic data, text data, or numeric data, via the CRT 13. The user can arbitrarily move a mouse cursor displayed on the CRT 13 in X and Y directions to select a menu or select or edit image data, graphic data, text data, or numeric data.

The PC 1004 further includes the VRAM 11, a display output control unit 12, and the CRT 13.

Data displayed on the CRT 13 is rasterized on the VRAM 11 as bitmap data. In the case of graphic data, a graphic pattern corresponding to the location and attribute information of the graphic data is rasterized on the VRAM 11. The graphic data can be displayed on the CRT 13 by software according to an operation performed via a cursor for selecting graphic data directly in a display area of the VRAM 11.

The PC 1004 further includes an external storage device control unit 14, the hard disk 15, and the FD 16, which store various data, such as image data, graphic data, text data, or numeric data.

The CPU 2 loads, from the hard disk 15 or the FD 16, a control program, such as the setting file transmission tool 2001, on the VRAM 11 and executes the read program.

As described above, according to an exemplary embodiment, the PC 1004, which is an example of an information processing apparatus, transmits setting information for an application program operating on the MFP 1003, which is an example of an image forming apparatus, to the MFP 1003.

Components, such as an acquisition unit, an apparatus selection receiving unit, a setting information selection receiving unit, an apparatus selection receiving unit, and a transmission control unit can be implemented as a program. For example, an apparatus selection receiving unit, a setting information selection receiving unit, an apparatus selection receiving unit, and a transmission control unit can be implemented as an apparatus selection receiving module, a setting information selection receiving module, an apparatus selection receiving module, and a transmission control module, respectively. Furthermore, a transmission history management unit and a receiving function program transmission unit can be implemented, as a program, as a transmission history management module and a receiving function program transmission module, respectively.

Moreover, a retransmission destination device selection receiving unit can be implemented, as a program, as retransmission destination device selection receiving module. Furthermore, the setting file transmission tool 2001 transmits an application that operates on the image forming apparatus.

According to an exemplary embodiment having the above-described configuration, a user can easily extract an image forming apparatus that has been installed with an application program that is a target of transmitting a setting file. Furthermore, according to an exemplary embodiment, a user can transmit the setting file for the application program to an appropriate image forming apparatus with a simple operation.

According to an exemplary embodiment of the present invention, even in the case where the image forming apparatus does not have a function for receiving the setting file, a function module for receiving a setting file is previously transmitted to and installed on the image forming apparatus. Accordingly, the present invention can be applied to an image forming apparatus that is not compliant with a setting file receiving function.

Thus, the present invention can be implemented on various types of image forming apparatuses in various different user environments, which can reduce operation costs for the image forming apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-111936 filed Apr. 20, 2007, which is hereby incorporated by reference herein in its entirety.

What is claimed is:

1. An information processing apparatus configured to transmit setting information used in an application program that operates on an image forming apparatus to the image forming apparatus, the information processing apparatus comprising:
   a processor comprising:
      an acquisition unit configured to acquire, from a plurality of image forming apparatuses, application information indicating a type of each application program installed on the plurality of image forming apparatuses;
      an application selection receiving unit configured to receive selection of an application program corresponding to the application information acquired by the acquisition unit;
      a setting information selection receiving unit configured to receive selection of setting information used in the application program whose selection has been received by the application selection receiving unit;
      an apparatus selection receiving unit configured to receive selection of an image forming apparatus as a destination to which to transmit the setting information from among image forming apparatuses installed with the application program whose selection has been received by the application selection receiving unit; and
      a transmission control unit configured to control processing for transmitting, to the image forming apparatus whose selection has been received by the apparatus selection receiving unit, the setting information whose selection has been received by the setting information selection receiving unit.

2. The information processing apparatus according to claim 1, wherein the transmission control unit includes an inquiry unit configured to inquire of the image forming apparatus whose selection has been received by the apparatus selection receiving unit about a storage destination of the application program whose selection has been received by the application selection receiving unit, and
   wherein the transmission control unit controls transmission processing to set the setting information to the image forming apparatus whose selection has been received by the apparatus selection receiving unit based on the storage destination acquired by the inquiry unit.

3. The information processing apparatus according to claim 1, wherein the apparatus selection receiving unit is configured to receive selection of at least one image forming apparatus from among the plurality of image forming apparatuses, and
   wherein the transmission control unit controls transmission processing to transmit the setting information to all of the at least one image forming apparatus whose selection has been received by the apparatus selection receiving unit.

4. The information processing apparatus according to claim 1, further comprising:
   a transmission history management unit configured to manage a transmission history about transmission processing performed by the transmission control unit; and
   a retransmission destination apparatus selection receiving unit configured to extract an image forming apparatus to which the setting information has not been transmitted from among image forming apparatuses whose selection has been received by the apparatus selection receiving unit based on the transmission history managed by the transmission history management unit, to display the extracted image forming apparatus, and to receive selection of an image forming apparatus as a destination to which to retransmit the setting information.

5. The information processing apparatus according to claim 1, further comprising:
   a receiving function determination unit configured to determine, before transmission of the setting information to the selected image forming apparatus, whether the selected image forming apparatus includes a function for receiving the setting information; and
   a receiving function program transmission unit configured to transmit a receiving function program for receiving the setting information to the selected image forming apparatus.

6. A method for transmitting setting information used in an application program that operates on an image forming apparatus to the image forming apparatus, the method comprising:
   acquiring, from a plurality of image forming apparatuses, application information indicating a type of each application program installed on the plurality of image forming apparatuses;
   receiving selection of an application program corresponding to the acquired application information;
   receiving selection of setting information used in the application program whose selection has been received;
   receiving selection of an image forming apparatus as a destination to which to transmit the setting information from among image forming apparatuses installed with the application program whose selection has been received; and
   controlling processing for transmitting, to the image forming apparatus whose selection has been received, the setting information whose selection has been received.

7. The method according to claim 6, further comprising:
inquiring of the image forming apparatus whose selection has been received about a storage destination of the application program whose selection has been received; and
controlling transmission processing to set the setting information to the image forming apparatus whose selection has been received based on the acquired storage destination.

8. The method according to claim 6, further comprising:
receiving selection of at least one image forming apparatus from among the plurality of image forming apparatuses, and
controlling transmission processing to transmit the setting information to all of the at least one image forming apparatus whose selection has been received.

9. The method according to claim 6, further comprising:
managing a transmission history about the transmission processing; and
extracting an image forming apparatus to which the setting information has not been transmitted from among image forming apparatuses whose selection has been received based on the managed transmission history, displaying the extracted image forming apparatus, and receiving selection of an image forming apparatus as a destination to which to retransmit the setting information.

10. The method according to claim 6, further comprising:
determining, before transmission of the setting information to the selected image forming apparatus, whether the selected image forming apparatus includes a function for receiving the setting information; and
transmitting a receiving function program for receiving the setting information to the selected image forming apparatus.

11. A computer-readable storage medium storing instructions which, when executed by an information processing apparatus configured to transmit setting information used in an application program that operates on an image forming apparatus, cause the information processing apparatus to perform operations comprising:
acquiring, from a plurality of image forming apparatuses, application information indicating a type of each application program installed on the plurality of image forming apparatuses;
receiving selection of an application program corresponding to the acquired application information;
receiving selection of setting information used in the application program whose selection has been received;
receiving selection of an image forming apparatus as a destination to which to transmit the setting information from among image forming apparatuses installed with the application program whose selection has been received; and
controlling processing for transmitting, to the image forming apparatus whose selection has been received, the setting information whose selection has been received.

* * * * *